(12) United States Patent
Shibata

(10) Patent No.: US 11,989,639 B2
(45) Date of Patent: May 21, 2024

(54) INFERENTIAL DEVICE, CONVOLUTIONAL OPERATION METHOD, AND PROGRAM

(71) Applicant: NEC CORPORATION, Tokyo (JP)

(72) Inventor: Seiya Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 932 days.

(21) Appl. No.: 16/977,349

(22) PCT Filed: Feb. 28, 2019

(86) PCT No.: PCT/JP2019/007756
§ 371 (c)(1),
(2) Date: Sep. 1, 2020

(87) PCT Pub. No.: WO2019/168084
PCT Pub. Date: Sep. 6, 2019

(65) Prior Publication Data
US 2021/0110236 A1    Apr. 15, 2021

(30) Foreign Application Priority Data
Mar. 2, 2018 (JP) .................................. 2018-038029

(51) Int. Cl.
G06N 20/00 (2019.01)
G06N 3/04 (2023.01)

(52) U.S. Cl.
CPC ..................................... *G06N 3/04* (2013.01)

(58) Field of Classification Search
CPC .......... G06N 3/04; G06N 3/045; G06N 3/063; G06F 17/10
See application file for complete search history.

(56) References Cited

U.S. PATENT DOCUMENTS

| | | | |
|---|---|---|---|
| 5,473,730 A | 12/1995 | Simard | |
| 6,038,337 A | 3/2000 | Lawrence et al. | |
| 2017/0286830 A1* | 10/2017 | El-Yaniv | G06N 3/045 |
| 2018/0314940 A1* | 11/2018 | Kundu | G06N 3/044 |
| 2019/0042948 A1* | 2/2019 | Lee | H03M 7/24 |

(Continued)

FOREIGN PATENT DOCUMENTS

| | | |
|---|---|---|
| JP | 07-191950 A | 7/1995 |
| JP | 10-021406 A | 1/1998 |

(Continued)

OTHER PUBLICATIONS

Wu, Jiaxiang, et al. "Quantized convolutional neural networks for mobile devices." Proceedings of the IEEE conference on computer vision and pattern recognition. 2016 (Year: 2016).*

(Continued)

*Primary Examiner* — Andrew T McIntosh
(74) *Attorney, Agent, or Firm* — Sughrue Mion, PLLC

(57) ABSTRACT

An inferential device, including a quantization part that quantizes a result of a convolutional operation in a convolutional neural network using input data and weights; a convolutional operation part that performs a convolutional operation using the quantized operation result as input data; and an input data conversion part that converts the input data to a first layer to enable the convolutional operation part to process both the input data to the first layer and the input data that is quantized by the quantization part in a same way.

9 Claims, 16 Drawing Sheets

(56) References Cited

U.S. PATENT DOCUMENTS

| | | | |
|---|---|---|---|
| 2019/0130245 A1 | | 5/2019 | Sakaguchi |
| 2019/0258932 A1* | | 8/2019 | Kang .................. G06N 3/045 |
| 2019/0379883 A1* | | 12/2019 | Wang .................. H04N 13/257 |
| 2020/0005131 A1 | | 1/2020 | Nakahara et al. |

FOREIGN PATENT DOCUMENTS

| | | |
|---|---|---|
| JP | 2016-157219 A | 9/2016 |
| JP | 6183980 B1 | 8/2017 |
| JP | 2017-211735 A | 11/2017 |
| JP | 2018-181313 A | 11/2018 |

OTHER PUBLICATIONS

Lin, Darryl, Sachin Talathi, and Sreekanth Annapureddy. "Fixed point quantization of deep convolutional networks." International conference on machine learning. PMLR, 2016 (Year: 2016).*

Sun, Fangxuan, Jun Lin, and Zhongfeng Wang. "Intra-layer non-uniform quantization of convolutional neural network." 2016 8th International Conference on Wireless Communications & Signal Processing (WCSP). IEEE, 2016 (Year: 2016).*

Masayuki Shimoda et al., "All Binarized Convolutional Neural Network and Its implementation on an FPGA", The International Conference on Field-Programmable Technology(FPT 2017), 2017, pp. 291-294.

Matthieu Courbariaux et al., "Binarized Neural Networks: Training Neural Networks with Weights and Activations Constrained to +1 or −1", Jan. 24, 2018, <URL: https://arxiv.org/pdf/1602.02830>.

Fengfu Li et al., "Ternary weight networks", Jan. 24, 2018, <URL:https://arxiv.org/pdf/1605.04711>.

Daisuke Miyashita et al., "Convolutional Neural Networks using Logarithmic Data Representation", arXiv Cornell University, Mar. 17, 2017, pp. 1-10.

Masayuki Shimoda et al., "Consideration of All Binarized Convolutional Neural Network", IEICE Technical Report, Jul. 19, 2017, pp. 131-136, vol. 117, No. 153.

Ishii Jun et al., "Evaluation of quantization bit-width optimization of each neuron for DNN", IEICE Technical Report, Jan. 11, 2018, pp. 125-132, vol. 117, No. 379.

International Search Report for PCT/JP2019/007756 dated May 14, 2019. [PCT/ISA/210].

* cited by examiner

INFERENTIAL DEVICE, CONVOLUTIONAL OPERATION METHOD, AND PROGRAM

REFERENCE TO RELATED APPLICATION

This application is a National Stage of International Application No. PCT/JP2019/007756 filed Feb. 28, 2019, claiming priority based on Japanese Patent Application No. 2018-038029 filed Mar. 2, 2018. The present invention relates to an inferential device, convolutional operation method, and program.

FIELD

Background

As described in PTL 1 and PTL 2, technical development has been active in image recognition, etc. using multilayer neural networks. Such technology is called 'deep learning'. Especially in the field of image recognition, etc., convolutional neural networks are widely used. The convolutional neural network includes a convolutional layer, a pooling layer, and a fully connected layer. In the convolutional layer, a process that convolutes a kernel in an entire image is executed.

A set of features convoluted in an image is obtained by a process convoluting a kernel into the entire image (a process applying a filter to the image). The set of features is also called 'feature map'. The feature map is obtained by applying an activation function to the convoluted value. For example, ReLU (Rectified Linear Unit) is widely used as an activation function in the field of image recognition.

As described above, the process convoluting the kernel (weights, filter) into an image (input image) is executed in the convolutional layer. At that time, a large number of the process are executed to multiply values of each pixel of the image and values of the weights many times.

NPL 1 discloses a one-bit conversion method for an image suitable for BinaryCNN (Convolutional Neural Network). The technic in the literature carries out the one-bit conversion branching signal line of a circuit handling an input signal on the assumption that an image used for CNN-reasoning is expressed by one-bit. In the technic disclosed in NPL 1, as the meaning of the input data is changed, it is necessary for weights used for CNN-reasoning to be re-learned.

NPL 2 to 4 disclose technics regarding "quantization" in CNN-reasoning. NPL 2 discloses a technic converting the result of convolutional operations to binary values. NPL 3 discloses a technic converting the result of convolutional operations to ternary values. NPL 4 discloses a technic converting the result of convolutional operations to four bits.

The technics disclosed in NPL 2 and NPL 3 limit a possible range of a result of a convolutional operation, and determine parameters by re-learning. In contrast, the technic disclosed in NPL 4 rounds the result (integers, floating point, etc.) of the convolutional operation to the power of two representation. In the disclosure of the present application, the quantization rounding the result of the convolutional to the power of two representation is referred to as "logarithmic quantization".

[PTL 1]
Japanese Patent Kokai Publication No. JP2017-211735A
[PTL 2]
JP Patent No. 6183980B

[NPL 1]
M. Shimoda, S. Sato, and H. Nakahara, "All Binarized Convolutional Neural Network and Its implementation on an FPGA", The International Conference on Field-Programmable Technology (FPT 2017), 2017
[NPL 2]
Matthieu Courbariaux, etc., "Binarized Neural Networks: Training Neural Networks with Weights and Activations Constrained to +1 or −1", Jan. 24, 2018, [online], [Retrieved Jan. 24, 2018], the Internet <URL: https://arxiv.org/pdf/1602.02830>
[NPL 3]
Fengfu Li and Bo Zhang, etc., "Ternary weight networks", Jan. 24, 2018, [online], [Retrieved Jan. 24, 2018], the Internet, <URL: https://arxiv.org/pdf/1605.04711>
[NPL 4]
Daisuke Miyashita, etc., "Convolutional Neural Networks using Logarithmic Data Representation", Jan. 24, 2018, [online], [Retrieved Jan. 24, 2018], the Internet, <URL: https://arxiv.org/pdf/1603.01025>

SUMMARY

Each disclosure of the above PTLs 1, 2 and NPLs 1 to 4 is incorporated herein by reference thereto. The following analyses have been made by the present inventor.

As described above, deep learning, above all, a huge number of multiplication processes are required for convolutional layer operations. The huge number of multiplication processes requires a massive hardware or a processor with powerful computing power. For that reason, even if the scale of hardware is reduced or a processor with low processing power is used, the technologies disclosed in NPLs 1 to 4 are necessary in order to finish the convolutional layer operation within a realistic time.

Especially, in the technic disclosed in NPL 4, an input data to be multiplied in a convolutional operation is rounded to a power of two representation, and the multiplication process of the rounded input data and its weights is performed in a single shift operation. As a result, the number of multiplications required for convolutional operation can be reduced and the hardware scale for performing convolutional operation can be reduced.

Thus, advantages such as reduction of the number of multiplications is provided by logarithmic quantization of input data and rounding of the input data to the power of two representation. Here, regarding the techniques disclosed in NPL 4, as the result of keen consideration by the inventor, it has turned out that logarithmic quantization of the input data of the first layer to which no convolutional operation has been applied results in decrease in recognition accuracy. Therefore, it can be said that the logarithmic quantization as disclosed in NPL 4 is presupposed to be applied to the input data of the second and subsequent layers.

In other words, it is impossible to apply the logarithmic quantization to the input data of a first stage (first layer), and execute a convolutional operation. Namely, it is impossible by one shift operation to complete multiplication processing of convolutional operation in the first layer. Concretely, as far as a convolutional operation in the first layer, it is necessary to perform a processing, repeatedly, of multiplying the multiplicand by the lowest-order value of the multiplier, and then adding the result of multiplying the multiplicand by the next digit of the multiplier with shifting the digits (Ordinarily integer multiplication is required.). That is, even if the input data of the second and subsequent layers is logarithmically quantized and the multiplication of convolutional operation is simplified by shift operation, the benefit is limited to the convolutional operations of the second and subsequent layers, and for the convolutional operation of the first layer, it is necessary to repeat the calculation in binary numbers.

The above fact means that a circuit (integer multiplier) is required to perform the convolutional operation of the first layer separately from the circuit (multiplier by shift operation) to perform the convolutional operation of the second and subsequent layers. However, the processing content (algorithm) of convolutional operation is not different in each layer, and preparing a plurality of circuits with different processings cannot be an effective use of resources such as FPGA (Field Programmable Gate Array). Or, preparing a plurality of different circuits requires a large scale FPGA, etc., which has a large impact on power consumption and cost.

The main purpose of the present invention is to provide an inferential device, a method of executing convolutional operations, and a program that contribute to the sharing of a circuit(s) for executing convolutional operations using quantized input data at each layer.

According to a first aspect of the present invention, there is provided an inferential device, comprising: a quantization part that quantizes a result of a convolutional operation in a convolutional neural network using input data and weights; a convolutional operation part that performs a convolutional operation using the quantized operation result as input data; and an input data conversion part that converts the input data to a first layer to enable the convolutional operation part to process both the input data to the first layer and the input data that is quantized by the quantization part in a same way.

According to a second aspect of the present invention, there is provided a method of performing a convolutional operation performed in an inferential device, comprising: a quantization part that quantizes a result of a convolutional operation in a convolutional neural network using input data and weights; and a convolutional operation part that performs a convolutional operation using the quantized operation result as input data, the method comprising: acquiring the input data; converting the input data to a first layer to enable to process both the input data to the first layer and the input data that is quantized by the quantization part in a same way in case where the acquired data is used for a convolutional operation of the first layer.

According to a third aspect of the present invention, there is provided a program, executed by a computer that performs a convolutional operation, installed in an inferential device comprising: a quantization part that quantizes a result of a convolutional operation in a convolutional neural network using input data and weights; and a convolutional operation part that performs a convolutional operation using the quantized operation result as input data, wherein the program causes the computer to perform processings of: acquiring input data; converting the input data to a first layer to enable to process both the input data to the first layer and the input data that is quantized by the quantization part in a same way in case where the acquired data is used for a convolutional operation of the first layer.

According to an individual aspect of the present invention, there are provided an inferential device, a method for executing convolutional operations, and a program that contributes to the sharing of a circuit for executing convolutional operations using quantized input data at each layer.

PREFERRED MODES

First, an outline of an exemplary embodiment will be described. In the following outline, various components are attached with reference signs for the sake of convenience. Namely, the following reference sings are merely used as examples to facilitate understanding of the outline. Thus, the disclosure is not limited to the description of the following outline. In addition, connecting lines between blocks in each figure include both bidirectional and unidirectional. One-way arrow schematically shows a flow of a main signal (data) and does not exclude bidirectionality. Also, in a circuit diagram, a block diagram, an internal configuration diagram, a connection diagram, etc., there are an input port and an output port at input end and output end of connection line respectively, although not explicitly disclosed. The same applies for an I/O interface.

Figure 1:
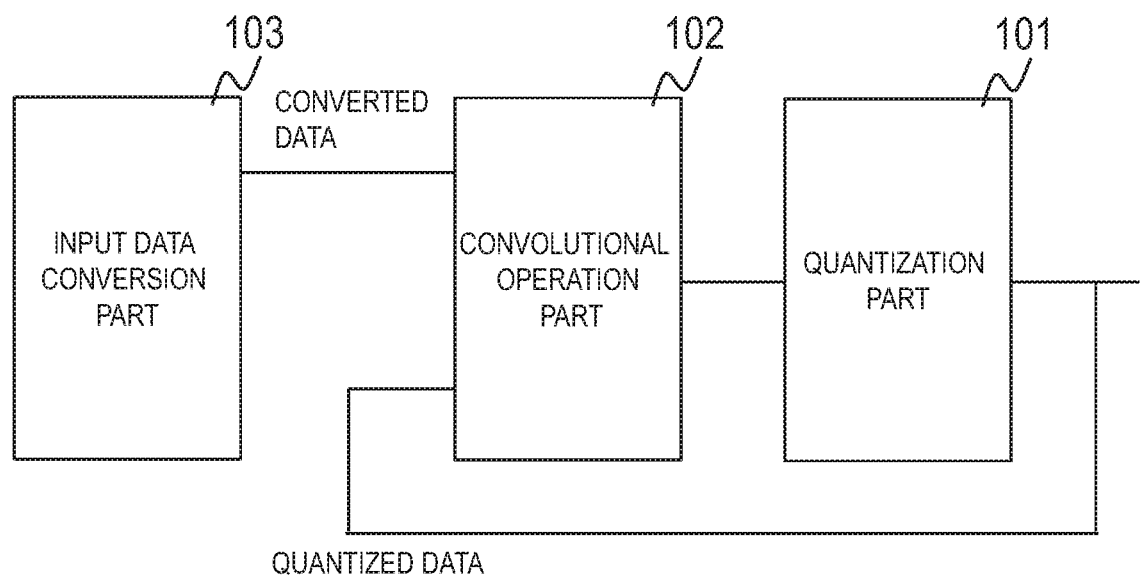
FIG. 1 illustrates an outline of an exemplary embodiment.

An inferential device according to an exemplary embodiment includes a quantization part 101, a convolutional operation part 102, and an input data conversion part 103 (see FIG. 1). The quantization part 101 quantizes a result of a convolutional operation in a convolutional neural network using input data and weights. The convolutional operation part 102 performs convolutional operation using the quantized operation result as input data. An input data conversion part 103 converts the input data to a first layer to enable to process both the input data to the first layer and the input data that is quantized by the quantization part 101 in a same way.

The above inferential device 100 is configured so that the multiplication process in the convolutional operation can be realized by the shift operation. More concretely, the convolutional operation part 102 is configured so that the convolutional operation multiplication process is completed by shifting the acquired weight to the left of the input data. The input data conversion part 103 converts the input data so that the convolutional operation part 102 can be used regardless of the layers. As a result, a circuit (convolutional operation part 102) that performs convolutional operations using the quantized input data can be shared in each layer.

Hereinafter, a specific exemplary embodiment will be described in more detail with reference to the drawings. In the exemplary embodiment, like reference characters refer to like components, and description thereof will be omitted.

First Exemplary Embodiment

A first exemplary embodiment will be described in more detail with reference to the drawings.

Figure 2:
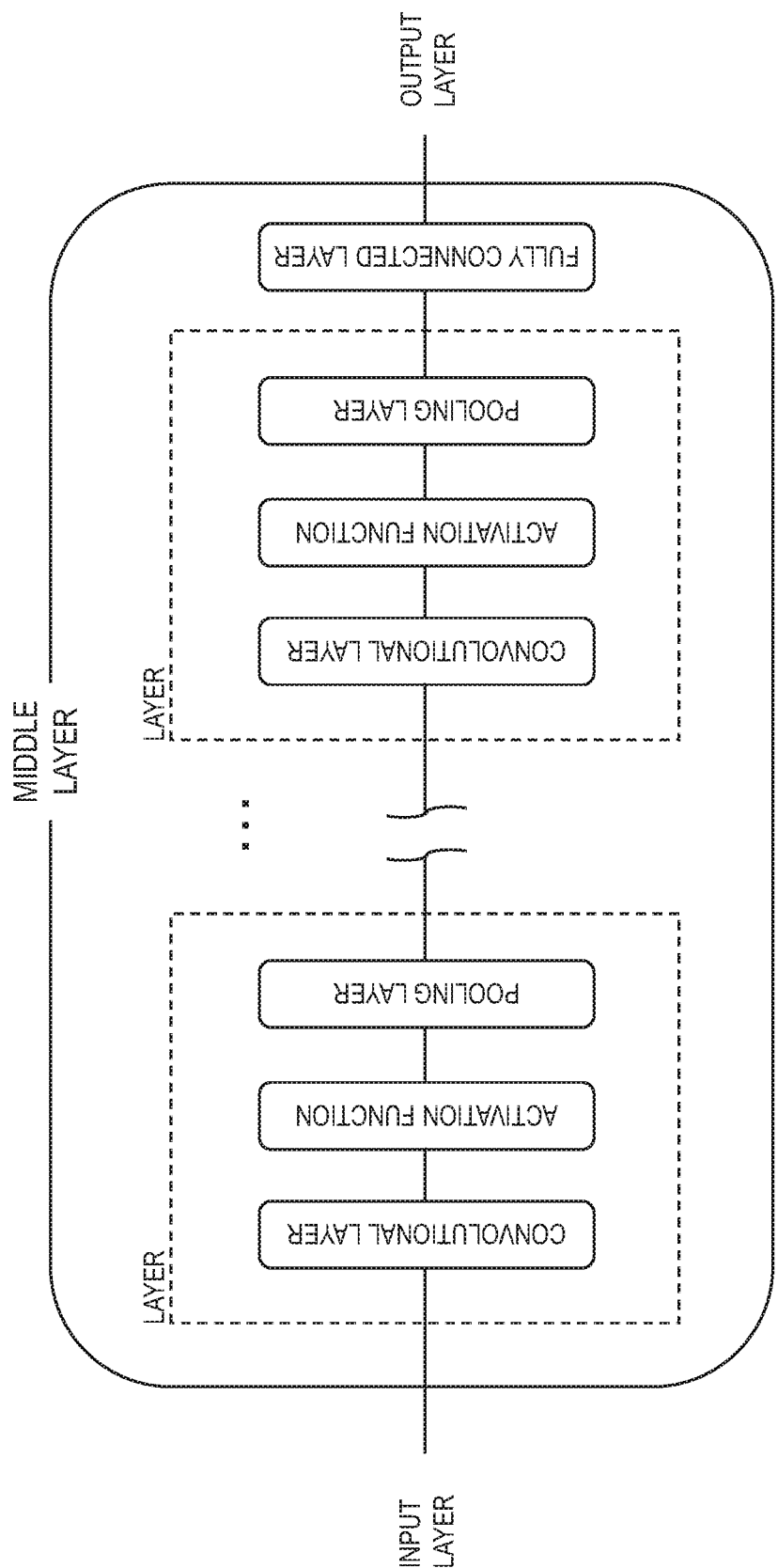
FIG. 2 illustrates a diagram to explain the structure of the middle layer (hidden layer) in image recognition.

FIG. 2 illustrates a diagram to explain the structure of a middle layer (hidden layer) in image recognition. Referring to FIG. 2, an input layer is connected to the middle layer, and the middle layer is connected to an output layer. Note that in the first exemplary embodiment, the data input to the input layer is assumed to be image data. However, of course, the input data handled in this disclosure is not limited to image data.

The input layer creates data to be output to the middle layer from the acquired input data. For example, when the image data consists of three channels of RGB (Red Green Blue), the input layer generates image data for each color and outputs them to the middle layer. The middle layer combines data of feature portions extracted from the input data by a convolutional neural network (CNN) into a single node and outputs feature variables. The output layer classifies the input data based on the feature variables obtained from the middle layer.

The middle layer includes a plurality of "layers", wherein a layer of first stage is connected to the input layer and a layer of the last stage is connected to a fully connected layer.

As layers making up the middle layer, they may include a convolutional layer, an activation function, and a pooling layer. It should be noted that the configuration shown in FIG. 2 is an example, and is not intended to limit the configuration of the middle layer. In some cases, the middle layer may not include an activation function or pooling layer.

The convolutional layer extracts feature values from the acquired input data. An activation function is applied to the extracted feature values, and the feature values to which the activation function has been applied are input to the pooling layer. In the pooling layer, the acquired feature values are combined. In the pooling layer, a processing is executed (a processing to obtain invariance) so that an object is identified as the same object even if the position of the object is changed. For example, a processing to allow for positional shifting of the object is performed in the pooling layer. Note that in FIG. 2, although a layer for applying the "activation function" is described as a layer independent from the convolutional layer and the pooling layer, the "activation function" may be configured to be included in any of the layers of the convolutional layer and the pooling layer, in actual practice.

As shown in FIG. 2, the layers comprising the middle layer are connected in cascade, wherein an output of a preceding layer corresponds to an input of a latter layer.

Figure 3:
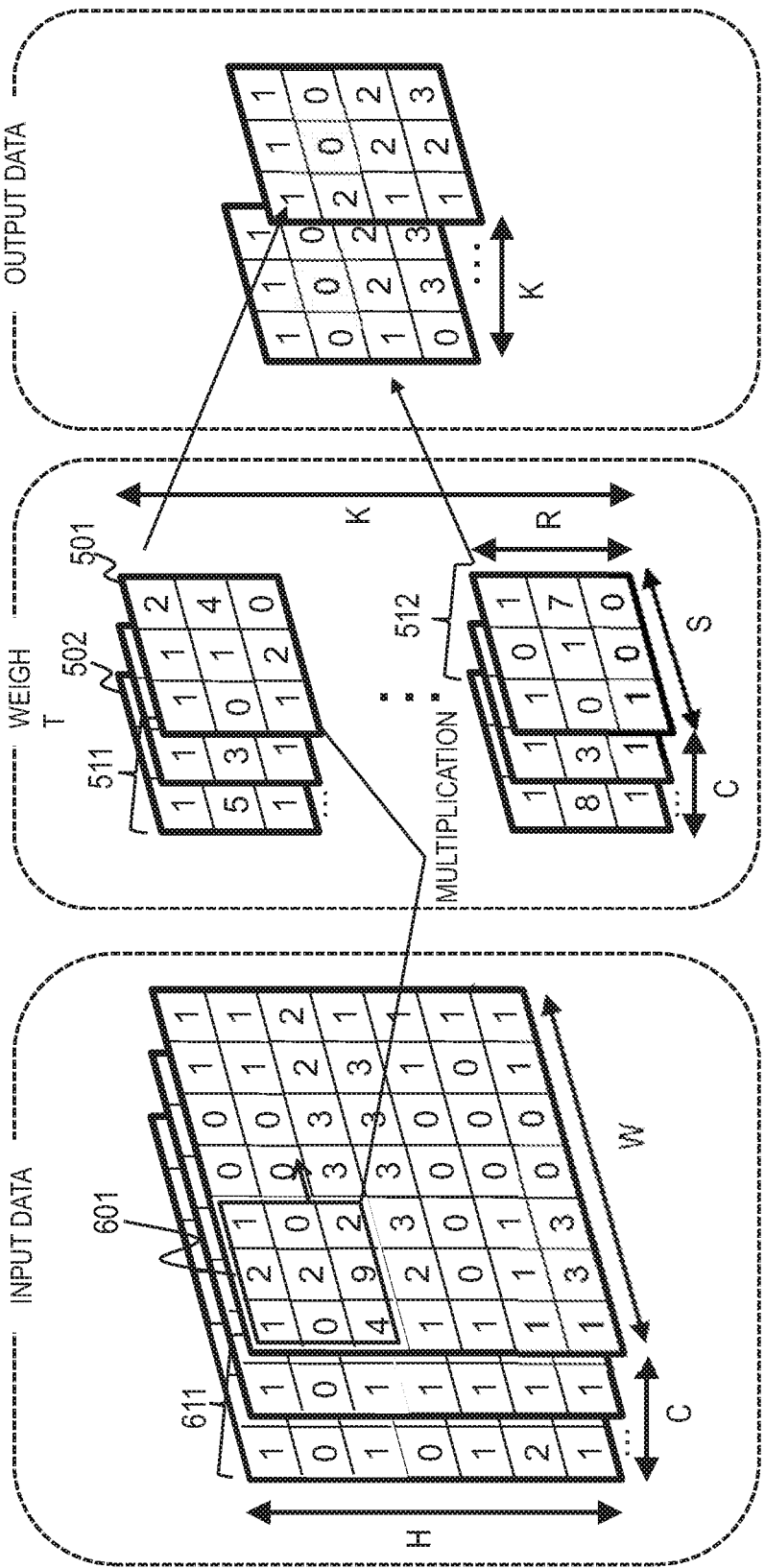
FIG. 3 illustrates a diagram to explain the operations in the convolutional layer.

FIG. 3 is a diagram to illustrate the operations in the convolutional layer. Referring to FIG. 3, the convolutional layer outputs feature values by multiplying the input data with weights (filter).

The various kind of parameters used in this disclosure are defined as shown in FIG. 3. The size of the input data in one direction (vertical direction in FIG. 3) is denoted by "H". In addition, the size of the input data in another direction (width direction in FIG. 3) is represented as "W". For example, if H=25 and W=25, then the size of the input data is 625 pixels (H×W=625). In addition, the number of input channels of the layer is denoted by "C".

The size of the weights in one direction (the vertical direction in FIG. 3) is denoted by "R". The size of the weights in another direction (width direction in FIG. 3) is denoted by "S". For example, if R=3 and S=3, then R×S=9 is the size of the weights.

The "K" shown in FIG. 3 is the number of output channels of the layer. The number of output channels K of each layer and the number of weight types are the same. For example, if the number of weight types shown in FIG. 3 is "4", then the number of output channels K of the layer is also "4".

One weight type includes the same number of weights as the number of input channels C. For example, if the number of input channels C is 3, one weight type includes three weights, and the C weights included in one weight type are associated with each of the C input data. For example, in FIG. 3, in C weights indicated at the upper row, the frontmost weights are associated with the frontmost input data.

In this disclosure, a set of weights classified by the number of input channels C is referred to as a "weight group". Each weight group includes C weights. Since the number of weight types is equal to the number of output channels K, the number of weights in the convolutional layer is K×C. Further, in the present disclosure, an illustration direction from one input data or weight(s) to another input data or weight(s) is referred to as "channel direction". Similarly, an illustration direction from one weight group to another weight group is referred to as the "kernel direction". For example, in FIG. 3 the illustration direction from weights 501 to weights 502 indicates the channel direction, and the illustration direction from weight group 511 to weight group 512 indicates the kernel direction.

In the convolutional layer, the following processings are executed: data corresponding to the size of the weights is extracted from the input data, the elements included in the extracted input data are multiplied by the corresponding weight elements, and the multiplication results are added up in the channel direction. For example, as shown in FIG. 3, if the size of the weights is 3×3=9, then data of the same size (e.g., input data 601 surrounded by a square area among the frontmost input data shown in FIG. 3) is extracted from the input data. Then, each element of the extracted input data and each element of the corresponding weight are multiplied. For example, in the example of FIG. 3, the upper left element value "1" in the extracted input data 601 is multiplied by the upper left element value "1" in the corresponding weights 501. In the convolutional layer, such a process is repeated (repeated nine times in the example above). Then, the results of the multiplication are added up.

The multiplication of the extracted input data and weights is performed between the corresponding (each) input data and (each) weight. For example, in FIG. 3, assume that the weights corresponding to the input data 601 shown at the foremost are the weights 501 shown at the foremost. Similarly, the weights corresponding to the input data illustrated in the middle are the weights illustrated in the middle, and the weights corresponding to the input data illustrated in the back-end are the weights 502 illustrated in the back-end. In this case, the above multiplication/add-up process is repeated between the corresponding (each) input data and (each) weights. Note, the sign "1" represents "and" in the present disclosure.

The results of the above multiplication/add-up process are added up in the channel direction. For example, in the above example, the multiplication/add-up results for the three channels (frontmost, middle, and back-end) are added up (accumulated).

The above multiplication/addition process and subsequent add-up process are performed for each of the weight groups. In the example of FIG. 3, operations are performed using the weight group 511 shown in the upper row and the input data, and the weight group 512 shown in the lower row is processed in the same way (multiplication/add-up process using the same input data and subsequent addition process).

In the convolutional layer, the above process (multiplication/add-up process and addition process in the channel direction) is repeated while changing the input data to be extracted. For example, as shown by the frontmost input data in FIG. 3, the input data is cut out while sliding a region to be extracted. The same process as above is applied to the cut out data.

The output data of the convolutional layer is obtained by repeating the process of extracting the input data as described above, multiplying the extracted input data by the weights, and adding-up them in the channel direction. As mentioned above, the multiplication/add-up process of input data and weights is performed for each weight group, so the number of output data matches with the types of weight (number of weight groups). For example, if sixteen weight groups are prepared, sixteen output data can be obtained (K=16).

The size of each output data (the size in the vertical direction and the size in the width direction) is determined by the specification (manner) of sliding the region (window) in which the data is extracted from the input data. In the example of FIG. 3, data is extracted from the input data so that each output data includes 12 (4×3) elements.

Figure 4:
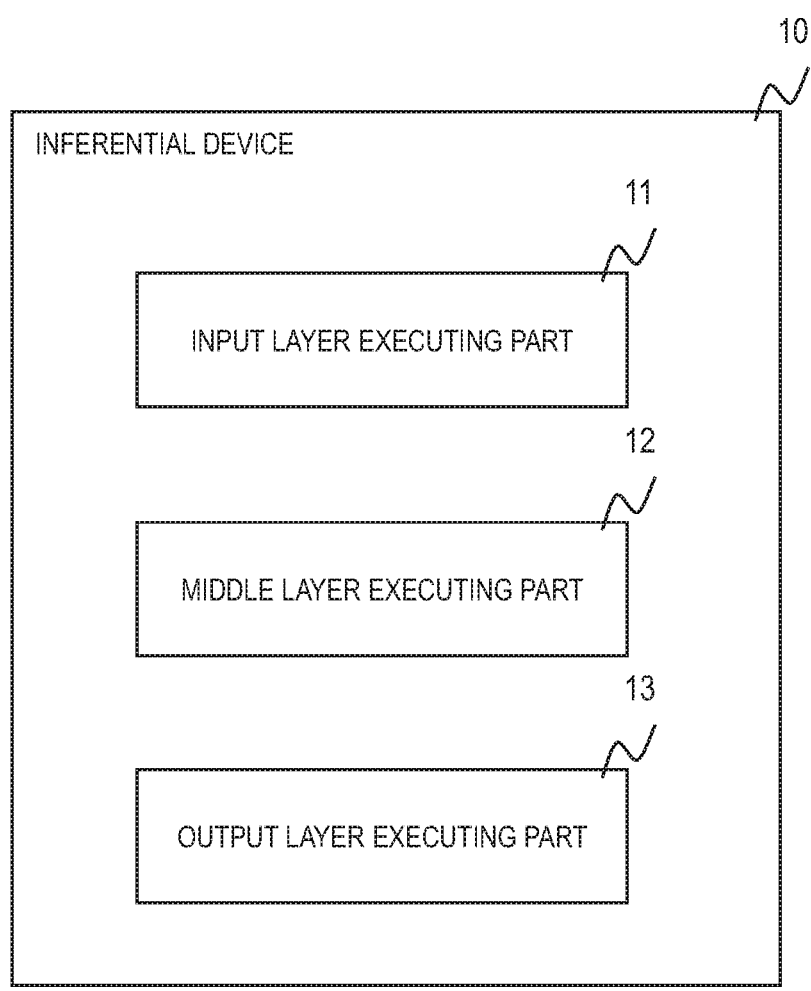
FIG. 4 illustrates a diagram showing an example of an internal configuration of an inferential device according to a first exemplary embodiment.

An inferential device 10 of the first exemplary embodiment executes the convolutional operation (computation) described using FIG. 3 in the process of inference. Concretely, as shown in FIG. 4, the inferential device 10 comprises an input layer executing part 11 that realizes an input layer, a middle layer executing part 12 that realizes a middle layer, and an output layer executing part 13 that realizes an output layer. In addition, the middle layer executing part 12 comprises a convolutional layer executing part 31 that realizes a convolutional layer, an activation function executing part 32 that executes an activation function, and a pooling layer executing part 33 that realizes a pooling layer in each of layers (see FIG. 5).

Figure 5:
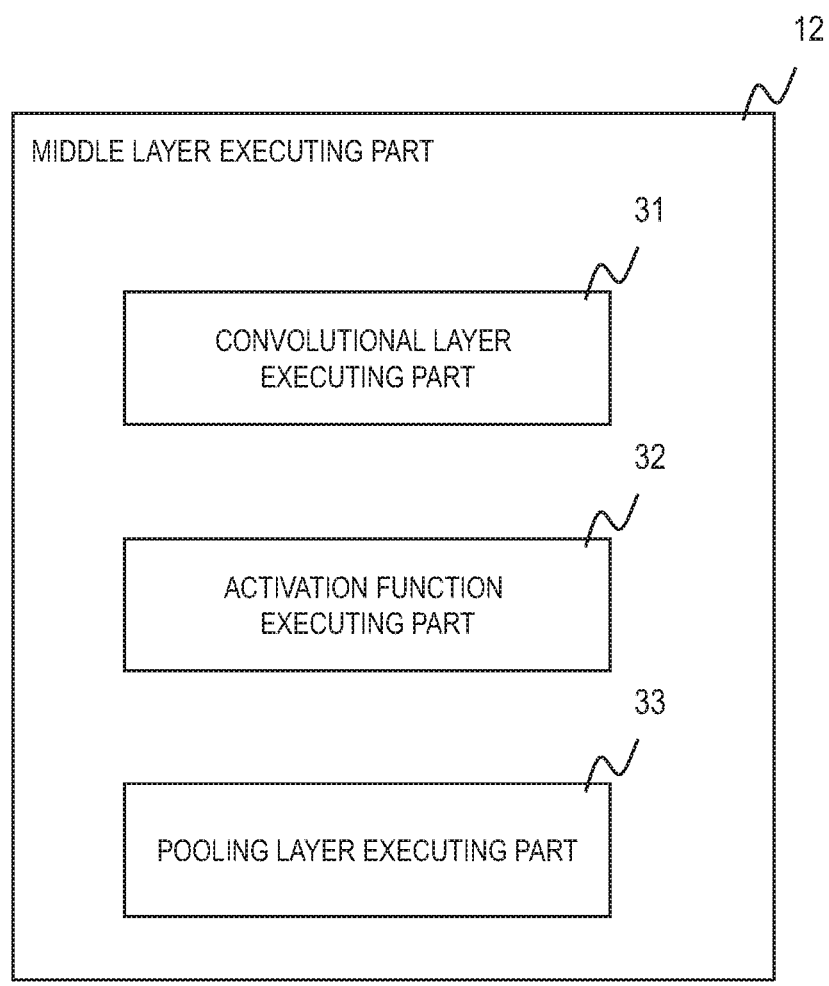
FIG. 5 illustrates an example of the internal configuration of the middle layer executing part of the inferential device according to the first exemplary embodiment.

In the present disclosure, among a variety of executing parts shown in FIGS. 4 and 5, the convolutional layer executing part 31 is described in detail. The other executing parts are omitted because they can be realized using known algorithm etc.

The convolutional layer executing part 31 executes the convolutional operation (multiplication/add-up processing) described using FIG. 3.

Figure 6:
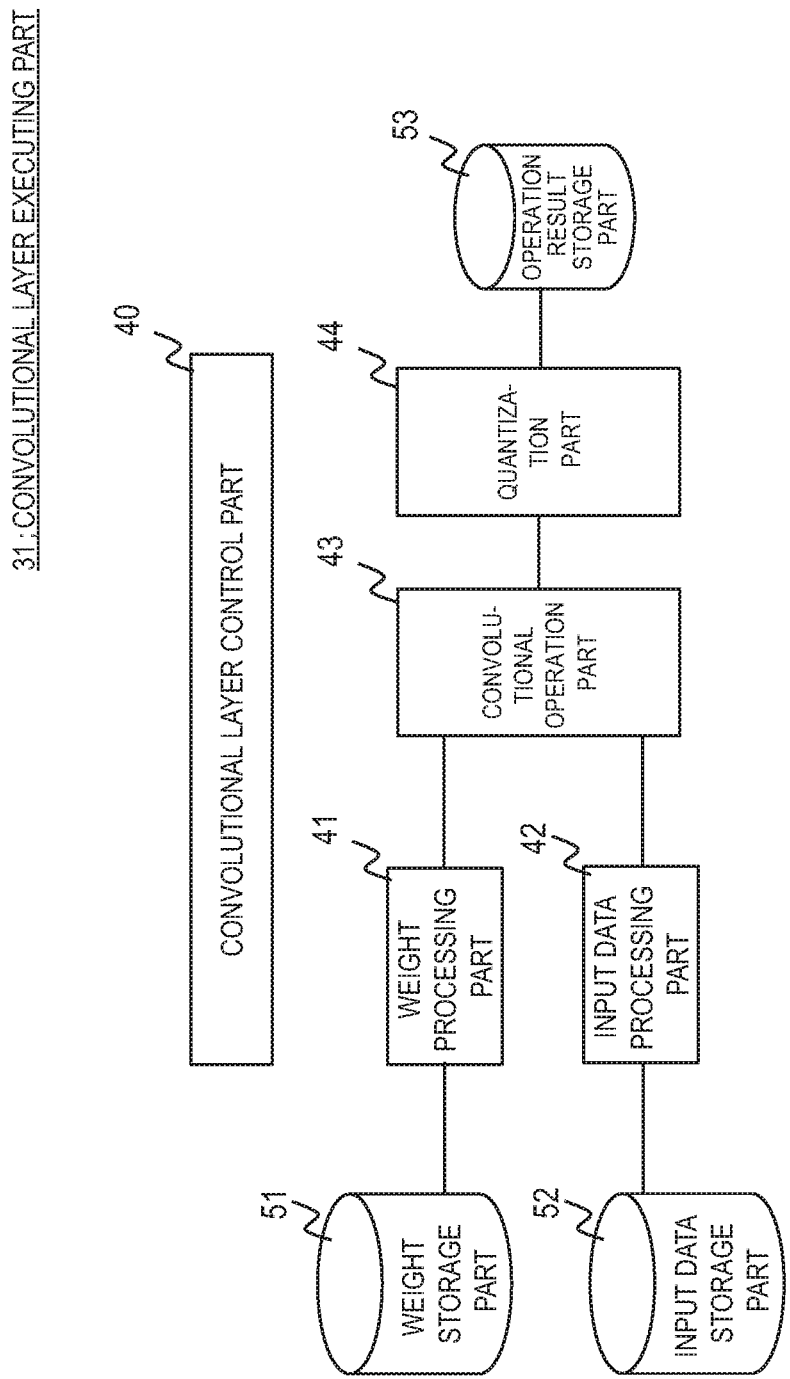
FIG. 6 illustrates an example of the internal configuration of the convolutional layer executing part according to the first exemplary embodiment.

FIG. 6 shows an example of an internal configuration of the convolutional layer executing part 31. Referring to FIG. 6, the convolutional layer executing part 31 includes a convolutional layer control part 40, a weight processing part 41, an input data processing part 42, a convolutional operation part 43, a quantization part 44, and various storage parts. The storage parts include a weight storage part 51, an input data storage part 52, and an operation result storage part 53.

The data (input data and weights) necessary for the convolutional operation of each layer are stored in the input data storage part 52 and the weight storage part 51. In the convolutional layer executing part 31, convolutional operations in the convolutional neural network using weights and input data are executed, and the results are stored in the operation result storage part 53. The results of the convolutional operation stored in the operation result storage part 53 are handed over to the activation function executing part 32. The results processed by the pooling layer executing part 33 are stored in the input data storage part 52, and the convolutional operation is executed again by the convolutional layer executing part 31.

The convolutional layer control part 40 is configured to control the convolutional layer executing part 31 as a whole. The convolutional layer control part 40 realizes the convolutional operation by controlling various modules (e.g., convolutional operation part 43 etc.).

The weights used for the convolution operation in each layer are stored in the weight storage part 51. The weight storage part 51 stores multiple groups of weights used in each layer classified for each layer. The weights stored in the weight storage part 51 may be set in advance before the operation of the inferential device 10, or they may be received from a host device (e.g., a learning device) each time and stored in the weight storage part 51.

The input data storage part 52 stores the input data used for the convolution operation. More precisely, the input data to be used for the convolutional operation of the first layer is stored initially in the input data storage part 52; when other processes (activation process, pooling process) executed in the first layer are completed, the input data (also activation) to be used for the convolutional operation of the second layer is stored in the input data storage part 52.

In response to an instruction from the convolutional layer control part 40, the weight processing part 41 accesses the weight storage part 51 and obtains a weight group suitable for the convolutional operation of each layer (used for the convolutional operation of each of the layers).

The input data processing part 42 accesses the input data storage part 52 in response to an instruction from the convolutional layer control part 40, and obtains the input data to be used for the convolutional operation of each layer.

The convolutional operation part 43 performs the convolutional operation using the weights and data (input data, activation) provided by the weight processing part 41 and the input data processing part 42. As will be described in detail later, the convolutional operation part 43 is configured to perform convolutional operations using the input data (activation) logarithmically quantized by the quantization part 44. Furthermore, the convolutional operation part 43 processes not only the data logarithmically quantized by the quantization part 44, but also the input data of the first layer in the same way as the input data (logarithmically quantized input data) of the second and subsequent layers. The convolutional operation part 43 outputs the result of the convolutional operation to the quantization part 44.

The quantization part 44 logarithmically quantizes the result of the convolutional operation by the convolutional operation part 43, as disclosed in NPL 4. More concretely, the quantization part 44 rounds (i.e., transforms) the acquired data to the power of two representation, and expresses the power of the two representation in terms of a power exponent (a power whose the base is 2). For example, if the acquired data is "8", the quantization part 44 converts the acquired data "8" to "3", which is a power exponent, since the value can be expressed as $2^3$. Moreover, the quantization part 44 expresses the data after the logarithmic quantization in 4 bits. Concretely, the log-quantized 4-bit data represents a power exponent whose the base is 2, or that the log-quantized data (the data to be log-quantized) is truly zero.

Note that in the present disclosure, one bit of the above four bits is assigned to information to manifestly show whether the log-quantized data truly means zero or a power exponent. In addition, three of the above four bits are used to represent a power exponent. In the following explanations, values obtained by logarithmic quantization (4-bit data) are referred to as "logarithmic quantization values".

The quantization part 44, for example, calculates the logarithm of a target value of the log quantization by setting the base to "2" and truncating digits below the decimal point, to logarithmically quantize the acquired data. For example, if the value to be quantized is "4", then the value "4" is logarithmically quantized to "2" ($Log_2 8=2$) [sic. $Log_2 4=2$]. Also, if the value of the logarithmic quantization target is "9", the value "9" is logarithmically quantized to "3" ($Log_2 9=3.169$; "3" by truncation of digits below the decimal point). Note that, as mentioned above, the quantization part 44 uses three of the four bits to represent a power exponent, so its upper bound is "7 (0111b)". In other words, a value greater than 128 ($2^7$) is rounded to 128 by logarithmic quantization processing by the quantization part 44. Note that in the present disclosure, when expressing a binary number, "b" is appended after the number.

In the present disclosure, the most significant bit (MSB) among the four bits of the logarithmic quantization value is used as a flag indicating whether or not the logarithmic quantization value is truly zero. Concretely, if the most significant bit is "1", the logarithmic quantization value is treated as truly zero regardless of the values of the other bits. On the other hand, if the most significant bit is "0", the remaining three bits represents an exponent. For example, a log-quantized value "1000b" indicates a true zero. A log-quantized value "0000b" indicates an exponent of power "0". The log-quantized value "0111b" indicates an exponent of power "7".

In this way, the quantization part 44 rounds the data to a power of two representation and converts the data to be log-quantized into a value that indicates a power exponent or whether it is truly zero. Furthermore, the logarithmic quantization in the present disclosure is not limited to the methods disclosed in NPL 4. For example, the logarithmic quantization value may be more than 4 bits of data. Also, the use of 4 bits to indicate log-quantized data is not limited to the above. For example, we may treat "1111b", which is one of the values that can be expressed in 4 bits, as ones representing the data for truly zero, and express the power exponent with the remaining numbers (0000b to 1110b). Furthermore, the calculation method for rounding the log-quantized data to the power of two is not limited to the above method. For example, the quantization part 44 may quantize the acquired data logarithmically by setting the base to "2" and calculating the logarithm of the target value of the logarithmic quantization and rounding up digits below the decimal point.

In the logarithmic quantization disclosed in NPL 4, the logarithmic quantization is converted to a specific minimum value whose the target value is smaller than a certain value, and to a specific maximum value when the target value is larger than a certain value. In addition, the logarithmic quantization calculates the logarithm of the target value when it is within a range defined by above the specific minimum and maximum value. In the present disclosure, the same treatment is to be performed.

Next, a detailed description of the convolutional operation part 43, the input data processing part 42, and the weight processing part 41 shown in FIG. 6 will be given.

[Convolutional Operation Part]

The convolutional operation part 43 executes the convolutional operation of the logarithmic quantized input data and weights. Even if activation function(s) and pooling process(es) are applied in each layer, the input data to the next layer remains in the log-quantized state. For example, if ReLU (Rectified Linear Limit) is used as the activation function, the negative value is converted to "0" and the positive value (power exponent) is output as it is. The parameters that change according to the operation of the pooling layer (before and after pooling) are the size W and H of the input data. In other words, the value of the log-quantized input data itself does not change in the pooling layer operation. Therefore, the log-quantization of the input data is maintained even if the activation function or pooling process is performed.

Figure 7:
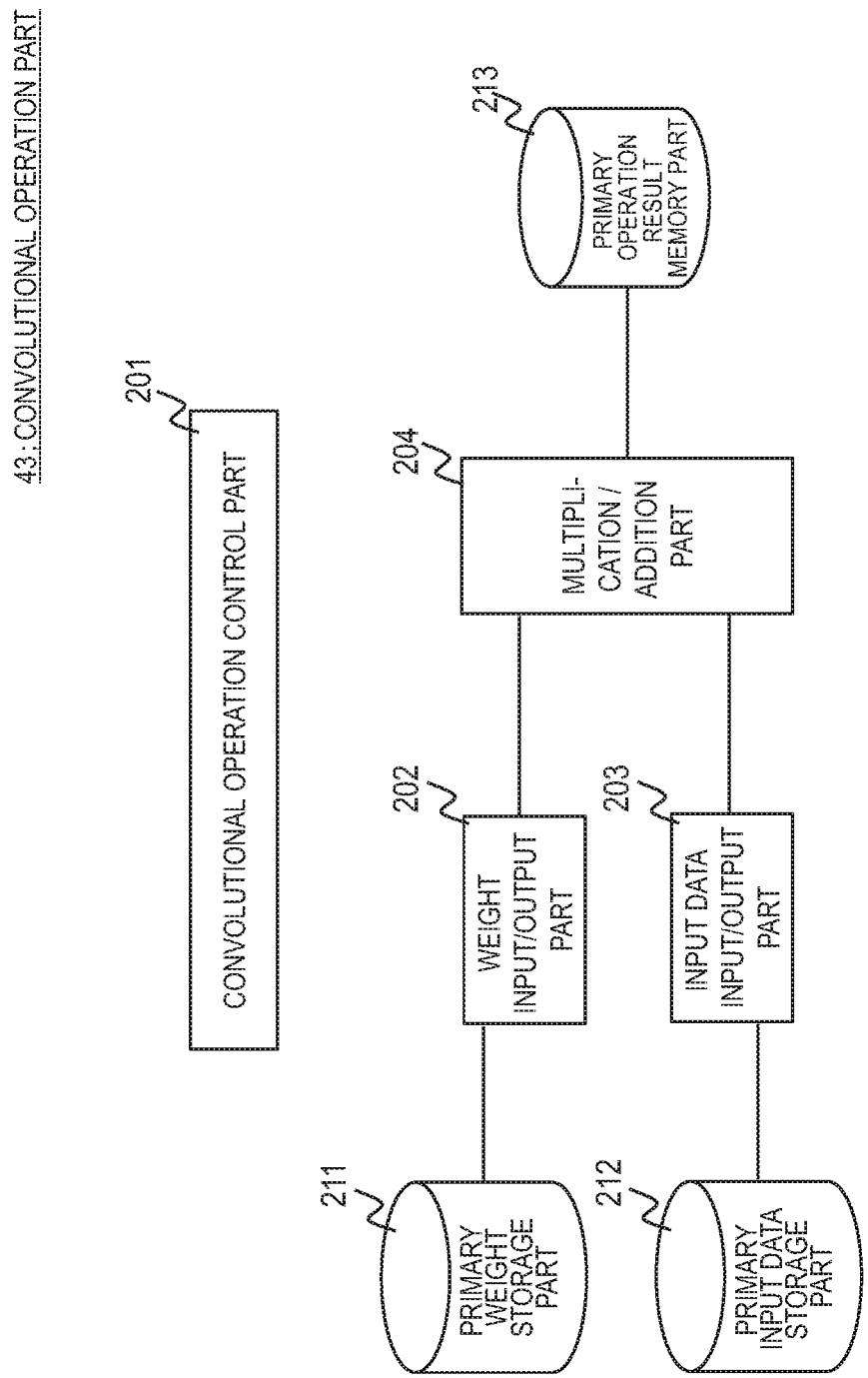
FIG. 7 illustrates an example of the internal configuration of the convolutional operation part according to the first exemplary embodiment.

FIG. 7 is a diagram showing an example of an internal configuration of the convolutional operation part 43. Referring to FIG. 7, the convolutional operation part 43 includes a convolutional operation control part 201, a weight input/output part 202, an input data input/output part 203, a multiplication/addition part (or multiply/accumulation part) 204, and various storage parts. The primary memory includes the primary weight storage part 211, the primary input data memory part 112, and the primary operation result memory part 213.

The primary weight storage part 211 and the primary input data storage part 212 temporarily store data provided by the weight processing part 41 and the input data processing part 42, respectively. In addition, the primary operation result memory part 213 stores the result of the operation by the multiplication/addition part 204 (the result of a single convolution operation).

The convolutional operation part 43 executes the convolutional operation using the data stored in the primary input data storage part 212 and the weights stored in the primary weight storage part 211.

The convolutional operation control part 201 is configured to perform convolutional operations using weights and input data (activation) by controlling a weight input/output part 202, an input data input/output part 203, and a multiplication/addition part 204.

The weight input/output part 202 executes processing related to weight input/output.

The input data input/output part 203 executes input/output processing of the input data.

The multiplication/addition part 204 executes the multiplication/addition process of the data supplied by the weight input/output part 202 and the input data input/output part 203, and performs the convolutional operation.

Figure 8:
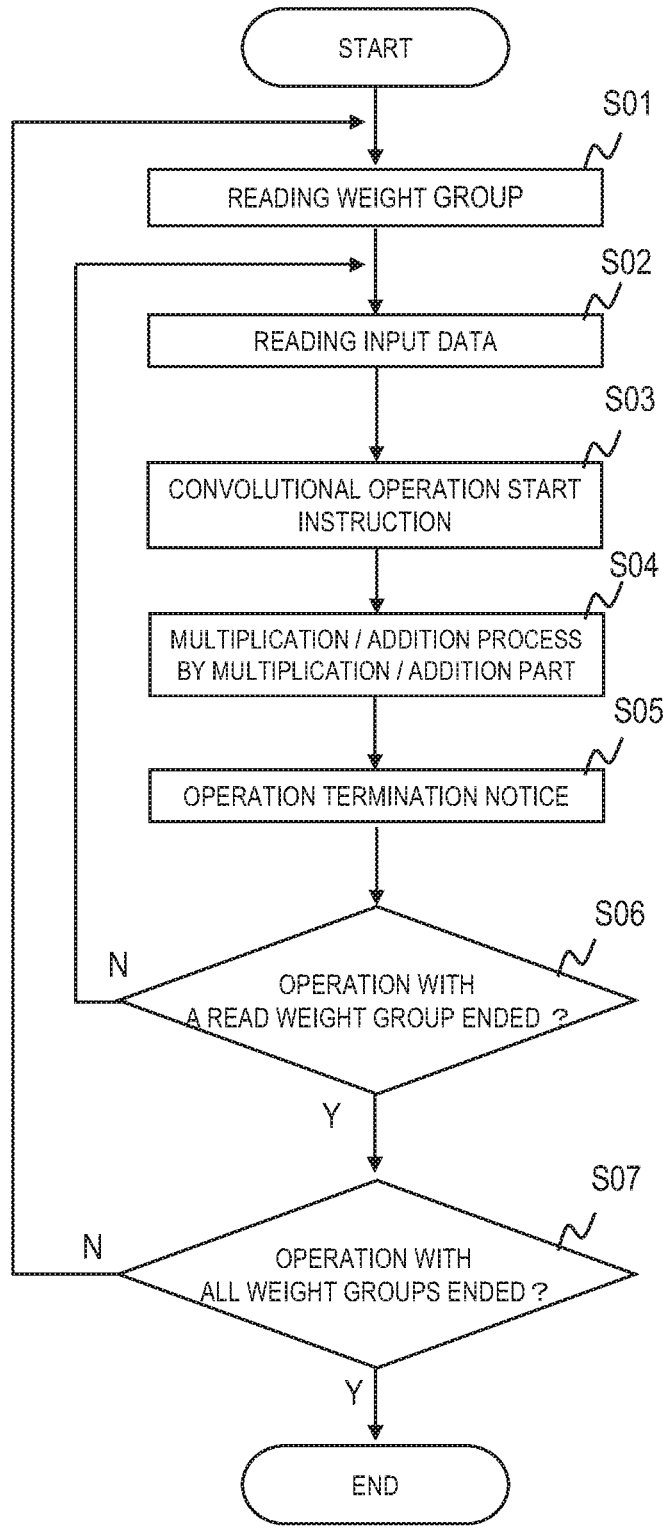
FIG. 8 illustrates a flowchart diagram showing an example of the operation of the convolutional operation part according to the first exemplary embodiment.

Next, with reference to FIG. 8, the operation of the convolutional operation part 43 is schematically explained.

The convolutional operation control part 201 specifies a weight group required for a single convolutional operation, and instructs the weight input/output part 202 to read the weight group (step S01).

Next, the convolutional operation control part 201 specifies the range of input data to perform the convolutional operation between the above weight group and the input data, and instructs the input data input/output part 203 to read the above input data (step S02).

For example, with reference to FIG. 3, the execution of a convolutional operation (a single convolutional operation) of the weight group 511 and the corresponding input data 611 is instructed. By this convolutional operation, "1" in the upper left of elements that form the output data at the frontmost of FIG. 3 is obtained. In this case, the convolutional operation control part 201 instructs the weight input/output part 202 to read out the weight group 511. Similarly, the convolutional operation control part 201 instructs the input data input/output part 203 to read the corresponding input data 611.

When the acquisition of data in the weight input/output part 202 and input data input/output part 203 is complete, the convolutional operation control part 201 instructs the weight input/output part 202, the input data input/output part 203, and the multiplication/addition part 204 to "start convolutional operation" (step S03).

The weight input/output part 202 and the input data input/output part 203 supply the previously acquired weights and input data to the multiplication/addition part 204, respectively, which receives the instruction.

The multiplication/addition part 204 executes the multiplication processing for the convolutional operation using the data supplied by the weight input/output part 202 and the input data input/output part 203 (step S04). Note that the configuration of the multiplication/addition part 204 and its operation will be described in detail later.

When the convolutional operation ends, the multiplication/addition part 204 informs the convolutional operation control part 201 of the completion of the convolutional operation (step S05). In addition, the multiplication/addition part 204 stores the result of the convolution operation (the result of convolution operation for a single convolution operation) in the primary operation result memory part 213.

Upon receiving the above notification, the convolutional operation control part 201 judges whether or not the convolutional operation using the weight group read out by the weight input/output part 202 has been completed (step S06). For example, in the above example, if a weight group 511 is read out, it is judged whether or not all convolutional operations using the weight group 511 have been completed.

If all convolutional operations using the read weight group have not been completed (if the weight group and input data for convolutional operations remain; step S06, No branch), the convolutional operation control part 201 returns to step S02 and continues processing. In this case, the convolutional operation control part 201 instructs the input data input/output part 203 to read the input data while specifying an appropriate range (it instructs reading the input data by moving the sliding window).

If all convolutional operations using the read weight groups are completed (step S06, Yes branch), the convolutional operation control part 201 judges whether or not the convolutional operation using all the weight groups is completed (step S07).

If the weight group requiring convolutional operation remains (step S07, No branch), the convolutional operation control part 201 returns to step S01 and continues the processing. In this case, the convolutional operation control part 201 specifies the following weight group and performs the convolutional operation(s) using the weight group.

If there is no weight group that requires convolutional operation (step S07, Yes branch), the convolutional operation control part 201 terminates the process.

When the convolutional operation is completed, the convolutional operation control part 201 notifies the convolutional layer control part 40 of this fact. Upon receiving this notification, the convolutional layer control part 40 judges that the convolution operation in the current layer has been completed, and informs the later layer (activation function) to that effect. When the processing by the pooling layer executing part 33 is completed, the convolutional layer control part 40 executes the convolutional operation of the next layer.

Figure 9:
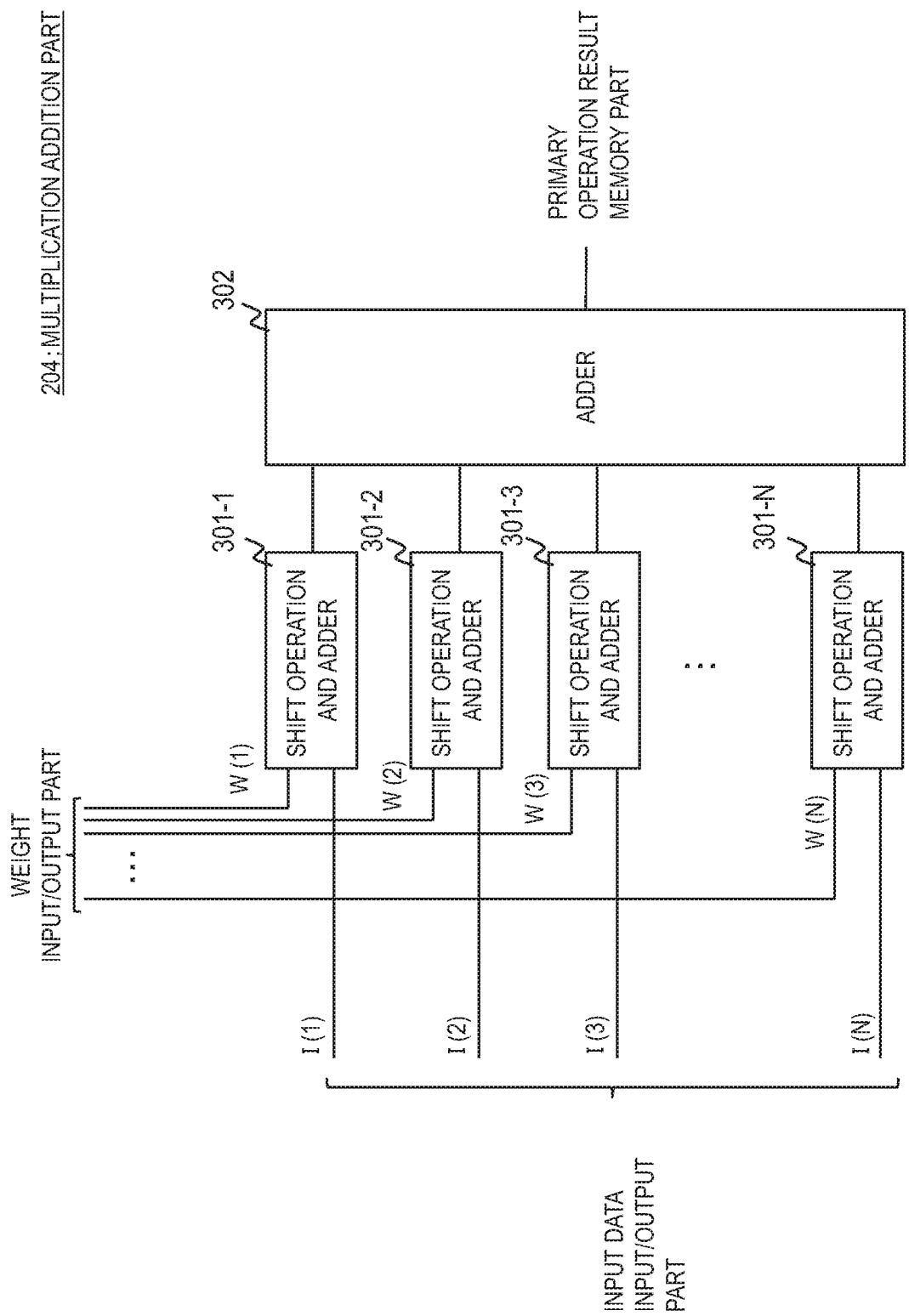
FIG. 9 illustrates an example of the internal configuration of the multiplication/addition part according to the first embodiment.

Next, the multiplier addition part 204 is explained. FIG. 9 is a diagram showing an example of an internal configuration of the multiplication/addition part 204. Referring to FIG. 9, the multiplication/addition part 204 includes a plurality of shift operation and adder 301-1 to 301-N (where N is a positive integer, hereinafter the same), and an adder 302. In the following explanation, unless there is a particular reason to distinguish between shift operation and adders 301-1 to 301-N, it is simply referred to as shift operation and adder 301. Similarly, other configurations are also disclosed as representing by the number preceding hyphen.

A shift operation and adder 301 is provided for each channel comprising the input data. More concretely, the shift operation and adder 301 is provided as many channels as are handled by the convolutional layer executing part 31. For example, in a Visual Geometry Group (VGG) 16, which is a typical model for image applications in deep learning, the final number of channels is 512. In this case, 512 shift operation and adder 301 are prepared (N=512).

The shift operation and adder 301 executes the shift operation for each element of the channel that forms the input data and its corresponding weights, and adds the results of the shift operation. More concretely, each of the shift operation and adder 301 obtains the weights and corresponding input data from the weight input/output part 202 and the input data input/output part 203. For example, in the example of FIG. 3, the shift operation and adder 301-1 is supplied with the input data 601 corresponding to the weight 501. The numbers in parentheses of "I(N)" and "W(N)" in FIG. 9 indicate the input data and weight channels supplied to the shift operation and adder 301.

Each of the shift operation and adder 301 multiplies the supplied input data and the corresponding elements of the weights, and adds the results of each multiplication. In this case, since the supplied input data is logarithmically quantized (since the input data is an power exponent when the bottom is 2), the shift operation and adder 301 performs the multiplication process by the shift operation instead of the normal integer multiplication process. In other words, the logarithmic quantization value is a value representing an exponential power or a logarithmic quantization value that is truly zero, so if the shift operator and adder 301 shifts the weights to the left by the number of logarithmic quantization value, it is regarded to have performed the multiplication process between the weights and the input data.

Figure 10:
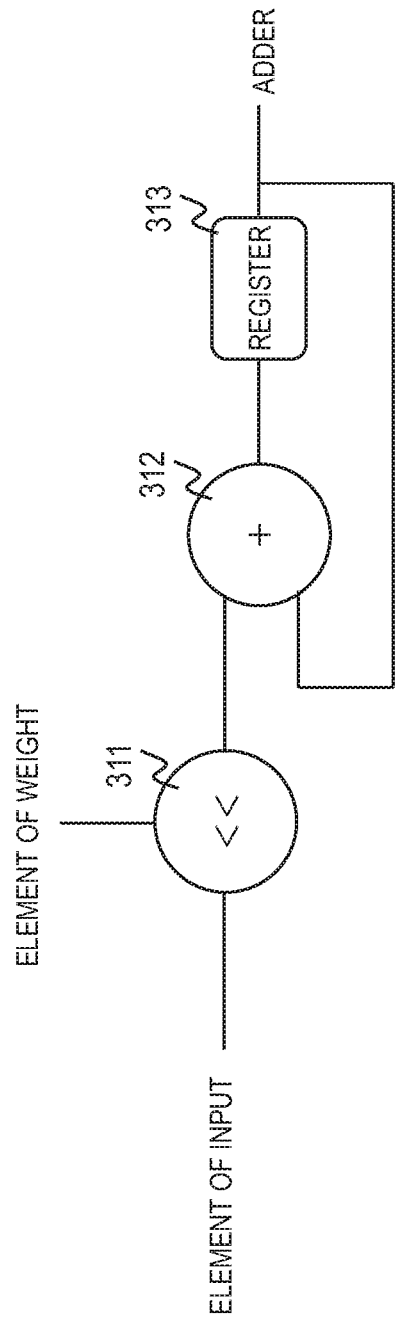
FIG. 10 illustrates an example of the internal configuration of the shift operation and add part according to the first exemplary embodiment.

FIG. 10 is a diagram showing an example of an internal configuration of the shift operation and adder 301. Referring to FIG. 10, the shift operation and adder 301 comprises a shift operator 311, an adder 312, and a register 313. Note that in FIG. 10, a register for temporarily storing acquired weights and input data and a module (controller) for controlling the weights and input data supplied to the shift operator 311 are omitted.

The shift operator 311 shifts the acquired element values of the weights to the left by a number corresponding to the value of the element of the input data (log-quantized value; power exponent). For example, if the logarithmic quantization value is "0011b", the acquired weight value are shifted by 3 bits to the left and output to the adder 312. The adder 312 adds the value stored in the register 313 (the initial value is zero) and the value output by the shift operator 311, and stores the result in the register 313. If the logarithmic quantization value is "1000b", this value indicates that the input data is truly zero, so the input data is not multiplied by the weights (no shift operation).

The shift operation and adder 301 calculates a left shift of each element of the acquired weight corresponding to an element value of the corresponding input data (i.e., a logarithmic quantization value), and repeats the process of adding the multiplication result (the result of the left shift operation) using the adder 312 and the register 313. The result of the summation by each shift operation and adder 301 (the final retained value of register 313) is output to the adder 302.

The adder 302 adds-up the summation results obtained from each shift operation and adder 301 to form a result of an operation by a single convolutional operation. The result of the operation is stored in the primary operation result memory part 213.

In this way, the convolutional operation part 43 (multiplication/addition part 204) realizes the multiplication process executed by the convolutional operation by the shift operation corresponding to the element value of each element making up the acquired input data.

[Input Data Processing Part]

The explanation returns to FIG. 6. When the data obtained from the input data storage part 52 is used in the first layer, the input data processing part 42 performs a prescribed conversion process on the obtained input data, and supplies the converted input data to the convolution processing part 43. On the other hand, when the data (activation) obtained from the input data storage part 52 is to be used in the second and subsequent layers, the input data processing part 42 supplies the obtained data to the convolutional operation part 43 without performing any special processing.

Figure 11:
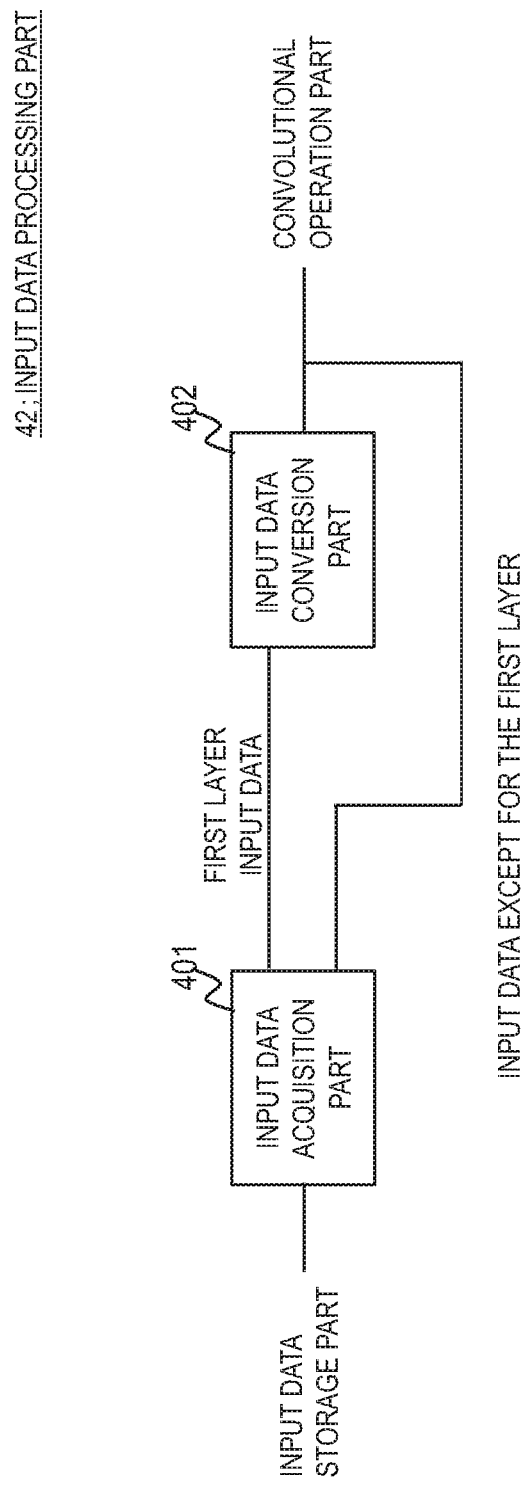
FIG. 11 illustrates an example of the internal configuration of the input data processing part according to the first exemplary embodiment.

In order to realize the above function, the input data processing part 42 is configured as shown in FIG. 11. Referring to FIG. 11, the input data processing part 42 includes an input data acquisition part 401 and an input data conversion part 402.

The input data acquisition part 401 accesses the input data storage part 52 in response to an instruction from the convolutional layer control part 40, and obtains the data (input data, activation) necessary for the convolutional operation of each layer. In this case, the input data acquisition part 401 supplies the acquired data to the input data conversion part 402, if the layer to which the data acquisition is directed is the first layer. The input data acquisition part 401 supplies the acquired data to the convolutional operation part 43 as it is, if the layer for which the data acquisition is indicated is the second layer or later.

The input data conversion part 402 is configured to convert the input data of the first layer so that the convolutional operation part 43 can process the input data used for the convolutional operation of the first layer and the input data logarithmically quantized by the quantization part 44 in the same way. More concretely, the input data conversion part 402 converts the input data of the first layer while ensuring that the input data before and after the conversion are equivalent.

Figure 12:
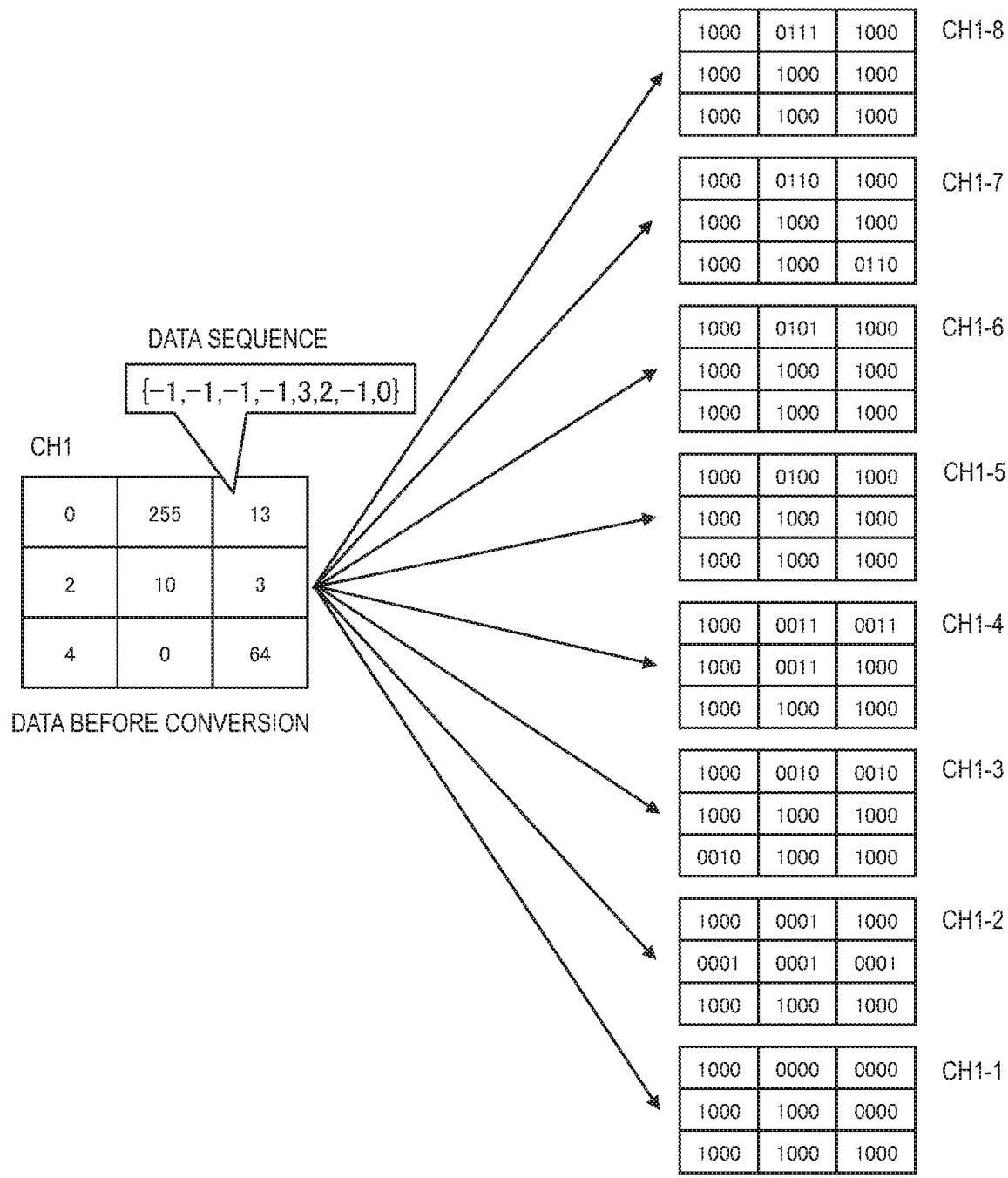
FIG. 12 illustrates the operation of the input data conversion part.

Referring to FIG. 12, the conversion process by the input data conversion part 402 is described in detail. For ease of understanding, FIG. 12 illustrates the input data for one channel (3×3 size). Each value of the element of the input data shall be represented by 8 bits (0-255).

Initially, the input data conversion part 402 extends one channel included in the input data of the first layer to a number of subchannels equal to the number of bits of the element that forms the input data of the first layer. For example, as shown in FIG. 12, when a value of an element of input data is represented by 8 bits, the input data conversion part 402 generates eight subchannels CH1-1 to CH1-8.

Next, the input data conversion part 402 converts the value in the digit "1" to a value that indicates the position (bit position) of the digit "1" when the element value is expressed by a binary number for each element of the channel included in the input data of the first layer. In addition, the input data conversion part 402 converts the vale in digit with a value of 0 to a value for which the data after conversion is truly zero. In this way, the input data conversion part 402 generates a data sequence having a plurality of elements from each element of the input data. For example, if the value of an element in the input data is "13", its binary notation is "00001101b". For convenience, if the value that truly represents zero is "−1", the input data conversion part 402 generates a data sequence {−1, −1, −1, −1, 3, 2, −1, 0}. Note that the bit position of the least significant bit is set to "0" in the processing of the input data conversion part 402 above.

In this way, the input data conversion part 402 generates a data sequence whose elements represent a bit position of the digit in which "1" is set or a value that truly indicates zero, according to the above process. Note that the bit positions of the binary numbers in the data sequence are taken as an exponent when the base is set to 2 in the multiplication/addition part 204. In other words, the multiplication/addition part 204 can treat the data generated by the quantization part 44 (logarithmic quantization value) and the data generated by the input data conversion part 402 (conversion value) equally.

The input data conversion part 402 assigns each of elements (bit position, a value indicating a true zero) that form the above data sequence to each of elements of the previously generated subchannel. At that time, the input data conversion part 402 assigns each of elements that form a data sequence to the position of the element of the subchannel corresponding to the position of each element of the one channel included in the input data of the first layer. For example, in FIG. 12, the respective elements of the data sequence generated from an element (element value 13) located at the upper right position of the input data prior to conversion are arranged distributedly as elements located at the upper right positions of the generated subchannels, respectively.

For example, in the above example in which the element value of the input data is "13", the generated data sequence is {−1, −1, −1, −1, 3, 2, −1, 0}. In the example of FIG. 12, CH1-1 to CH1-8 are generated as subchannels of channel 1 (CH1). Now, the elements that form the above generated data sequence are assigned to subchannels in order from the left to the right, then, the element value [at the upper right position] of subchannels CH1-8 becomes "−1". As described above, the quantization part 4 quantizes the input data logarithmically by 4 bits, and the true zero is expressed by "1000b." In accordance with this expression, the element value of subchannels CH1-8 is expressed as "1000b". The element values of subchannels CH1-7 to CH-5 [sic. CH1-5] are expressed as 1000b in the same way. Then, the element value of subchannel CH 1-4 is expressed as "0011b" because the corresponding element value of the data sequence is "3". Similarly, the element value of subchannel CH1-3 is expressed as 0010b, subchannel CH1-2 as 1000b, and subchannel CH1-1 as 0000b.

The input data conversion part 402 applies the process of generating the data sequence as described above to all elements of the acquired input data to generate the corresponding data sequence, and assigns respective elements of the data sequence to respective elements of the subchannel. Moreover, the input data conversion part 402 applies to all channels of the acquired input data, the process of generating the above-mentioned subchannels, the process of generating the data sequence, and the process of assigning respective elements of the data sequence to respective elements of the subchannel.

Figure 13:
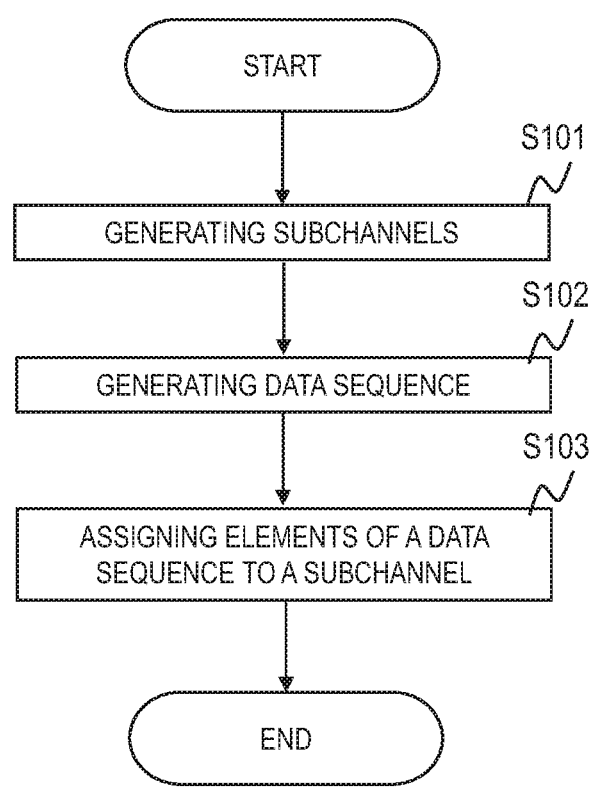
FIG. 13 illustrates a flowchart diagram to explain the operation of the input data conversion part according to the first exemplary embodiment.

The operation of the above input data conversion part 402 is summarized in the flowchart shown in FIG. 13.

Initially, the input data conversion part 402 generates subchannels for each channel of the input data in accordance with the number of bits of each element value that forms the input data before conversion (step S101). Next, the input data conversion part 402 expresses each element value of the input data in binary notation, and generates a data sequence whose elements are a number that indicates a bit position or a number that indicates a true zero in the data after logarithmic quantization, depending on the value of each bit (0, 1) (step S102). Finally, the input data conversion part 402 assigns each element of the generated data sequence to each element of the subchannel while retaining the positions of each element of the input data and each element of the subchannel (step S103).

The input data conversion part 402 supplies the subchannels generated as described above to the convolutional operation part 43 as logarithmic quantized input data (activation). For example, when the input data is image data consisting of three RGB channels, one channel is expanded to eight subchannels, and therefore 24 (3×8) channels are supplied to the convolutional operation part 43.

Since each element of the subchannel is an exponential power or truly zero, the multiplication required for the convolutional operation in the convolutional operation part 43 (or more precisely, the multiplication/addition part 204) can be realized by a shift operation. Also, in the convolutional operation, the result of the multiplication is equal to the result of the convolutional operation using the input data before the conversion and the result of the convolutional operation using the input data after the conversion, because the results of the multiplications are added-up after the multiplication of the corresponding elements of channels and weights.

For example, consider the case where the element value of the input data before conversion is "13" and the value of the corresponding weight is "2". In this case, the result of the multiplication of input data and weights is "26". Since the element value "13" can be expressed as $2^3+2^2+2^0$, the multiplication result is equal to an addition of a value of 3-bit left shift, a value of 2-bit left shift, and an unshifted value of the weight element value "2". The result of the shift operation and addition is 26 (16+8+2=26).

Next, the equality of the results of convolutional operations using input data before the data conversion and convolutional operations using input data after the data conversion is explained by formulae.

The formula for the convolutional operation can be expressed as Formula 1 below.

$$a_{x,y,k}^{n+1} = \sum_{c=1}^{C}\sum_{j=1}^{R}\sum_{i=1}^{S}\left(w_{i,j,c,k} * a_{(x-\lceil\frac{S}{2}\rceil+i),(y-\lceil\frac{R}{2}\rceil+j),c}^{n}\right)$$ [Formula 1]

In Formula 1, w indicates the element of weight, a indicates the element of input data (activation), n indicates the order of layers, suffixes i and j indicate the positions of input data and weights in the width and height directions, x and y indicate the positions of output data, C, S and R indicate the number of channels and the size of weights, as described above.

If the input data (activation) is in a log-quantized state, the input data "a" can be written as $a=2^l$ (where l is a power exponent and a positive integer. (Same below). Then, the following Formula 2 and Formula 3 are obtained from Formula 1.

$$a_{x,y,k}^{n+1} = \sum_{c=1}^{C}\sum_{j=1}^{R}\sum_{i=1}^{S}\left(w_{i,j,c,k} * 2^{l^{n}_{(x-\lceil\frac{S}{2}\rceil+i),(y-\lceil\frac{R}{2}\rceil+j),c}}\right)$$ [Formula 2]

$$a_{x,y,k}^{n+1} = \sum_{c=1}^{C}\sum_{j=1}^{R}\sum_{i=1}^{S}\left(w_{i,j,c,k} \ll l^{n}_{(x-\lceil\frac{S}{2}\rceil+i),(y-\lceil\frac{R}{2}\rceil+j),c}\right)$$ [Formula 3]

In addition, when the element value of the input data before the conversion is 8-bit integer, upon the data conversion by the input data conversion part 402, the input data "a" is as shown in the following Formula 4.

$$a = \sum_{l=0}^{L-1} 2^l$$ [Formula 4]

Note that L is the number of subchannels generated by the input data conversion part 402. In the above example, L=8.

Using Formula 4, Formula 1 can be transformed as shown in Equations Formula 5 to Formula 7 below.

$$a_{x,y,k}^{n+1} = \sum_{c=1}^{C}\sum_{j=1}^{R}\sum_{i=1}^{S}\left(w_{i,j,c,k} * \sum_{l=0}^{L-1} 2^{l^{n}_{(x-\lceil\frac{S}{2}\rceil+i),(y-\lceil\frac{R}{2}\rceil+j),c}}\right)$$ [Formula 5]

$$a_{x,y,k}^{n+1} = \sum_{c=1}^{C}\sum_{j=1}^{R}\sum_{i=1}^{S}\sum_{l=0}^{L-1}\left(w_{i,j,c,k} * 2^{l^{n}_{(x-\lceil\frac{S}{2}\rceil+i),(y-\lceil\frac{R}{2}\rceil+j),c}}\right)$$ [Formula 6]

$$a_{x,y,k}^{n+1} = \sum_{c=1}^{C}\sum_{j=1}^{R}\sum_{i=1}^{S}\sum_{l=0}^{L-1}\left(w_{i,j,c,k} \ll l^{n}_{(x-\lceil\frac{S}{2}\rceil+i),(y-\lceil\frac{R}{2}\rceil+j),c}\right)$$ [Formula 7]

In Formula 7, if the input data is 3 channels of RGB and $$\Sigma_{c=1}^{3}\Sigma_{l=0}^{L-1}$$

is considered to be the number of channels 3×L, then Formula 7 and Formula 3 are equivalent. Thus, the result of the convolution operation using the converted input data (subchannels in which each element is a power exponent) by the input data conversion part 402 is the same as the result of the convolution operation [using data] before the data conversion.

Note that the format of the logarithmic quantization value obtained by the logarithmic quantization processing of the quantization part 44 and that of the conversion value obtained by the conversion processing of the input data conversion part 402 are the same, but the processing of the above two modules looks like similar but is different.

As mentioned above, the logarithmic quantization process of the quantization part 44 rounds the target data to the power of two, and expresses the rounded data as an exponent. Therefore, it is not possible, in principle, to obtain the data before logarithmic quantization from the logarithmic quantization value done by the quantization part 44. In other words, processing by the quantization part 44 can be also said to be an irreversible conversion operation.

In contrast, the conversion process by the input data conversion part 402 is a processing that the target data is expressed as a power of two, and that these powers of two are distributedly arranged over (into) a plurality of multiple subchannels. In this case, the input data conversion part 402 expresses the power of two distributed to each subchannel as an exponent. Therefore, by restoring the power of two from the elements distributed to the subchannels and adding the restored results, the value before the data conversion can be obtained. In other words, the processing by the input data conversion part 402 can be said to be a reversible conversion operation.

[Weight Processing Part]

The explanation returns to FIG. 6. When the weights (weight group(s)) obtained from the weight storage part 51 are to be used in the first layer, the weight processing part 41 replicates a predetermined number of the obtained weights and supplies them to the convolutional operation part 43. On the other hand, when the weights obtained from the weight storage part 51 are to be used in the second layer or later, the weight processing part 41 does not perform any special processing and supplies the obtained weights to the convolutional operation part 43.

Figure 14:
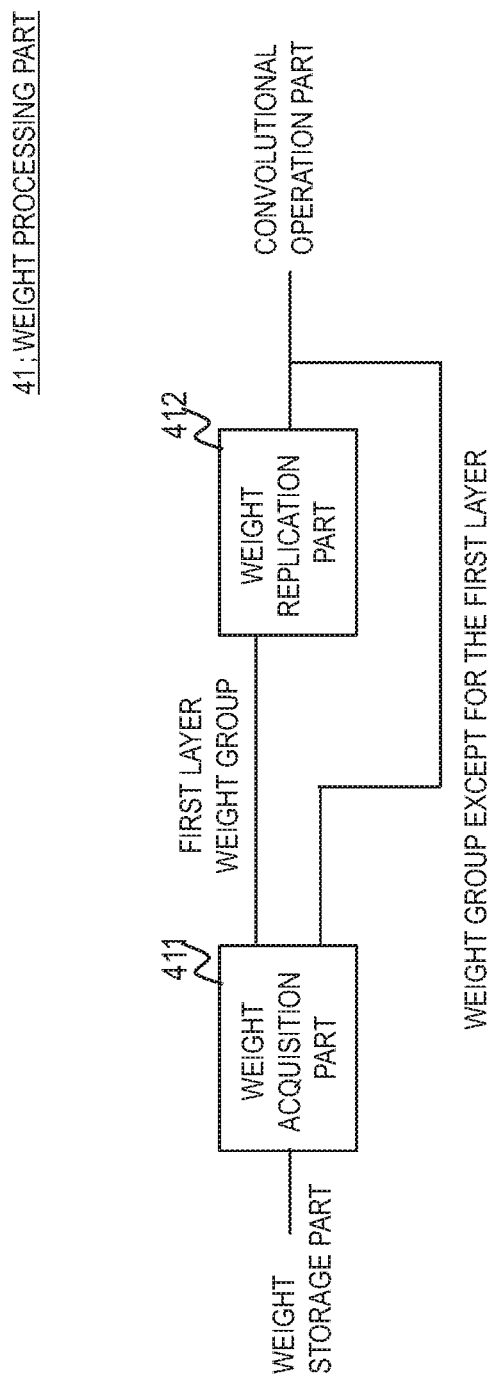
FIG. 14 illustrates an example of the internal configuration of the weight processing part according to the first exemplary embodiment.

In order to realize the above function, the weight processing part 41 is configured as shown in FIG. 14. Referring to FIG. 14, the weight processing part 41 includes a weight acquisition part 411 and a weight replication part 412.

In response to an instruction from the convolutional layer control part 40, the weight acquisition part 411 accesses the weight storage part 51 and obtains the weight groups (plural weight groups) necessary for the convolutional operation of each layer. In this case, the weight acquisition part 411 supplies the acquired weights to the weight replication part 412 if the layer to which the weight is to be acquired is the first layer. The weight acquisition part 411 supplies the acquired weights to the convolution operation part 43 as they are, if the layer for which the weight acquisition is instructed is the second layer or later.

The weight replication part 412 replicates a predetermined number of acquired weights (weight groups) of the first layer. Concretely, the weight replication part 412 replicates the weights corresponding to the one channel included in the input data of the first layer so that the number of weights corresponding to the one channel included in the input data of the first layer is the same number as the number of extended subchannels. That is, the weight replication part 412 replicates the corresponding weights so that they are the same number as the number of subchannels generated by the input data conversion part 402. For example, as described above, when the input data conversion part 402 generates eight subchannels from one channel, the weight replication part 412 replicates the corresponding weights of the first layer seven times. That is, the weight replication part 412 prepares eight identical weights.

In other words, the weight replication part 412 replicates the weights of the first layer so that the relationship between the weights and the input data before data conversion and the relationship between the weights and the input data (subchannels) after data conversion is maintained. This replication process enables the convolutional operation part 43 to process the data uniformly without taking into account of the layers of the provided data (input data and weights).

Next, the hardware configuration of the inferential device 10 of the first exemplary embodiment will be explained.

Figure 15:
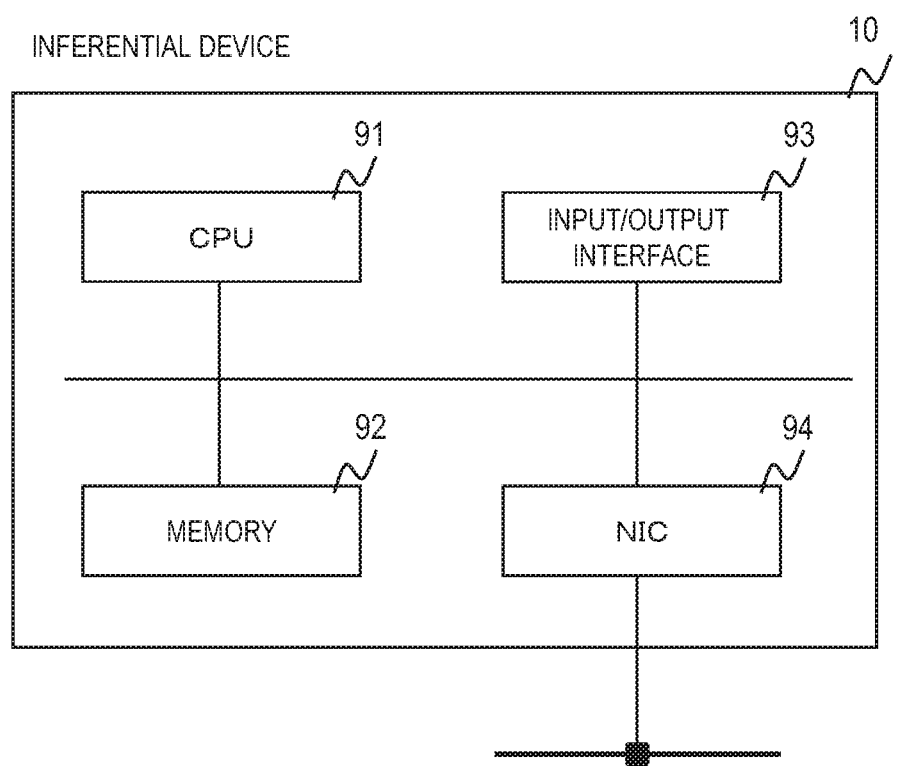
FIG. 15 illustrates a diagram showing an example of a hardware configuration of an inferential device.

FIG. 15 is a diagram showing an example of a hardware configuration of the inferential device 10. The inferential device 10 can be composed of a so-called information processing unit (computer), and has the configuration exemplified in FIG. 15. For example, the inferential device 10 includes a CPU (Central Processing Unit) 91, a memory 92, an input/output interface 93, and a NIC (Network Interface Card) 94, etc., which are interconnected by an internal bus.

Note that the configuration shown in FIG. 15 is not intended to limit the hardware configuration of the inferential device 10. The inferential device 10 may include hardware not shown. Alternatively, the number of CPUs included in the inferential device 10 is not limited to the example shown in FIG. 15; for example, a plurality of CPUs may be included in the inferential device 10.

Memory 92 is a RAM (Random Access Memory), a ROM (Read Only Memory), and an auxiliary storage device (hard disk, etc.).

The input/output interface 93 is a means to be an interface with the display device and the input device not shown. The display device is, for example, a liquid crystal display. An input device is a device that accepts user operations, such as a keyboard and a mouse, for example.

The function of the inferential device 10 is realized by the above-mentioned processing module. This processing module is realized, for example, by CPU 91 executing a program stored in the memory 92. Alternatively, a part of the processing module (e.g., the multiplication/addition part 204) may be realized (implemented in hardware) by hardware dedicated to specific applications, such as FPGA (Field Programmable Gate Array) or ASIC (Application Specific Integrated Circuit). In addition, the above program can be downloaded via a network, or updated using a storage medium that stores the program. Furthermore, the above processing module may be realized by a semiconductor chip. In other words, the functions performed by the above processing module can be realized by executing software on some kind of hardware.

As described above, the inferential device 10 of the first embodiment converts the input data used in the first layer so that the data obtained by the convolutional operation part 43 can be processed uniformly irrespective of (across) layers. In the first exemplary embodiment, since it is configured that the meaning of the conversion of the input data in question does not change before and after the conversion, the accuracy of the convolutional operation using the input data after the conversion does not degrade. In this respect, it is contrasted to the technique disclosed by NPL 1, in which the meaning is altered. Moreover, in the technique disclosed by NPL 1, relearning of weights was necessary, however in the inferential device 10 of the first exemplary embodiment, such relearning is unnecessary because the meaning of the input data does not change.

Second Exemplary Embodiment

To continue, the second exemplary embodiment will be described in detail with reference to the drawings.

In the first exemplary embodiment, it is assumed that the input data is a positive integer. However, in CNN learning and inference, the input data in the first layer may be negative or a real number (floating point representation). In the second exemplary embodiment, it will be explained that a convolutional operation circuit can be shared even when these input data are represented by negative value or floating point.

In CNN learning and inference using a specific dataset, there may be an occasion where the average value of the entire precomputed dataset is sometimes subtracted from the input data as a pre-processing of convolutional operations. For example, in an image dataset, an average value of each of the three RGB channels of the image (average of R dataset, average of G dataset, and average of B dataset) is calculated in advance. Then, the image obtained by subtracting the averages of the three values from the pixel values of the image data may be used as input for CNN inference.

The above procedure is expressed by the following Formula 8.

$$a'_{x,y,c} = a_{x,y,c} - ave_c \quad \text{[Formula 8]}$$

In Formula 8, $a'_{x,y,c}$ indicates the pixel value after the average value subtraction, which becomes the input data to CNN. $a_{x,y,c}$ indicates the pixel value of the coordinates (x, y) in each channel c of RGB. $ave_c$ indicates the average data set of each channel c.

As is clear from the above Formula 8, the input data (input pixel value) to the CNN is not always a positive integer if the input data is pre-processed, but may become a negative value or a floating point (real number) depending on the average data set value. In the configuration described in the first exemplary embodiment, these negative values and floating points cannot be handled as they are. Therefore, in the second exemplary embodiment, we will explain the case in which the convolutional operation circuit is shared by executing the process corresponding to the above pre-subtraction after the convolutional operation of the first layer is completed.

Note that the first exemplary embodiment does not refer to the bias to be added to the input data. This is because the bias added to the input data is usually a fixed value (e.g., "1"), and even if the bias is added, it only shifts the entire input data and does not affect the operation of the convolutional operation.

Rewriting Formula 1 to take the bias into account, we get the following Formula 9.

$$a^{n+1}_{x,y,k} = \sum_{c=1}^{C} \sum_{j=1}^{R} \sum_{i=1}^{S} \left( w^1_{i,j,c,k} * a^n_{(x-\lceil \frac{S}{2} \rceil + i),(y-\lceil \frac{R}{2} \rceil + j),c} \right) + b_k \quad \text{[Formula 9]}$$

In Formula 9, $b_k$ is a bias.

Considering the above prior subtraction, the following Formula 10 can be obtained by expressing the operation of the first CNN layer by using the above Formula 9.

$$a^2_{x,y,k} = \sum_{c=1}^{C} \sum_{j=1}^{R} \sum_{i=1}^{S} \left( w^1_{i,j,c,k} * a'^1_{(x-\lceil \frac{S}{2} \rceil + i),(y-\lceil \frac{R}{2} \rceil + j),c} \right) + b^1_k \quad \text{[Formula 10]}$$

In Formula 10, $b^1_k$ is the bias of the first layer. The bias $b^1_k$ of the first layer is a fixed value that is predetermined at the time of design.

Substituting Formula 8 into Formula 10 and expanding it, the following Formula 11 is obtained.

$$a^2_{x,y,k} = \sum_{c=1}^{C} \sum_{j=1}^{R} \sum_{i=1}^{S} \left( w^1_{i,j,c,k} * \left( a^1_{(x-\lceil \frac{S}{2} \rceil + i),(y-\lceil \frac{R}{2} \rceil + j),c} - ave_{(x-\lceil \frac{S}{2} \rceil + i),(y-\lceil \frac{R}{2} \rceil + j),c} \right) \right) + b^1_k \quad \text{[Formula 11]}$$

The above Formula 11 can be transformed into the following Formula 12 by the distributive law.

$$a^2_{x,y,k} = \sum_{c=1}^{C} \sum_{j=1}^{R} \sum_{i=1}^{S} \left( w^1_{i,j,c,k} * a^1_{(x-\lceil \frac{S}{2} \rceil + i),(y-\lceil \frac{R}{2} \rceil + j),c} \right) - \sum_{c=1}^{C} \sum_{j=1}^{R} \sum_{i=1}^{S} \left( w^1_{i,j,c,k} * ave_{(x-\lceil \frac{S}{2} \rceil + i),(y-\lceil \frac{R}{2} \rceil + j),c} \right) + b^1_k \quad \text{[Formula 12]}$$

Here, $w^1_{i,j,c,k}$ and $ave_{(x-\lceil \frac{S}{2} \rceil + i),(y-\lceil \frac{R}{2} \rceil + j),c}$ are a value that does not depend on (x, y) coordinates, Formula 12 can be rewritten to Formula 13 below.

$$a^2_{x,y,k} = \sum_{c=1}^{C} \sum_{j=1}^{R} \sum_{i=1}^{S} \left( w^1_{i,j,c,k} * a^1_{(x-\lceil \frac{S}{2} \rceil + i),(y-\lceil \frac{R}{2} \rceil + j),c} \right) - \sum_{c=1}^{C} \sum_{j=1}^{R} \sum_{i=1}^{S} \left( w^1_{i,j,c,k} * ave_c \right) + b^1_k \quad \text{[Formula 13]}$$

In Formula 13, the second term of the right-hand side $$\Sigma_{c=1}^{C} \Sigma_{j=1}^{R} \Sigma_{i=1}^{S} (w_{i,j,c,k}^1 * ave_c)$$

can be replaced by a variable $b'^1_k$ that depends on k. Furthermore, if we replace $-b'^1_k + b^1_k$ in the second and third terms with $bnew^1_k$ in Formula 13, the convolutional operation (convolutional operation with pre-subtraction) shown by Formula 13 after the substitution can be regarded as equivalent to Formula 9.

This fact means that the input data in the first CNN layer can be made positive by, in place of the pre-subtraction, setting a new bias $bnew^1_k (= -b'^1_k + b^1_k)$ as the bias to be added to the convolutional operation result in the first layer. In other words, the right side term 1 of Formula 13 is equivalent to a convolutional operation using the input data before the pre-subtraction performed in a specific data set, etc., and the right side terms 2 and 3 can be considered as new biases. This means that if the input data of the first layer is processed (conversion of input data, execution of convolutional operation) in the same way as in the first exemplary embodiment, and then a new bias is added, the same processing result as the convolutional operation using the input data for which the above pre-subtraction was performed can be obtained. In other words, in the second exemplary embodiment, by executing a process corresponding to the subtraction process performed beforehand after the convolutional operation of the first layer is completed, the input data to be subjected to data conversion by the input data conversion part 402 is ensured to be a positive integer.

Figure 16:
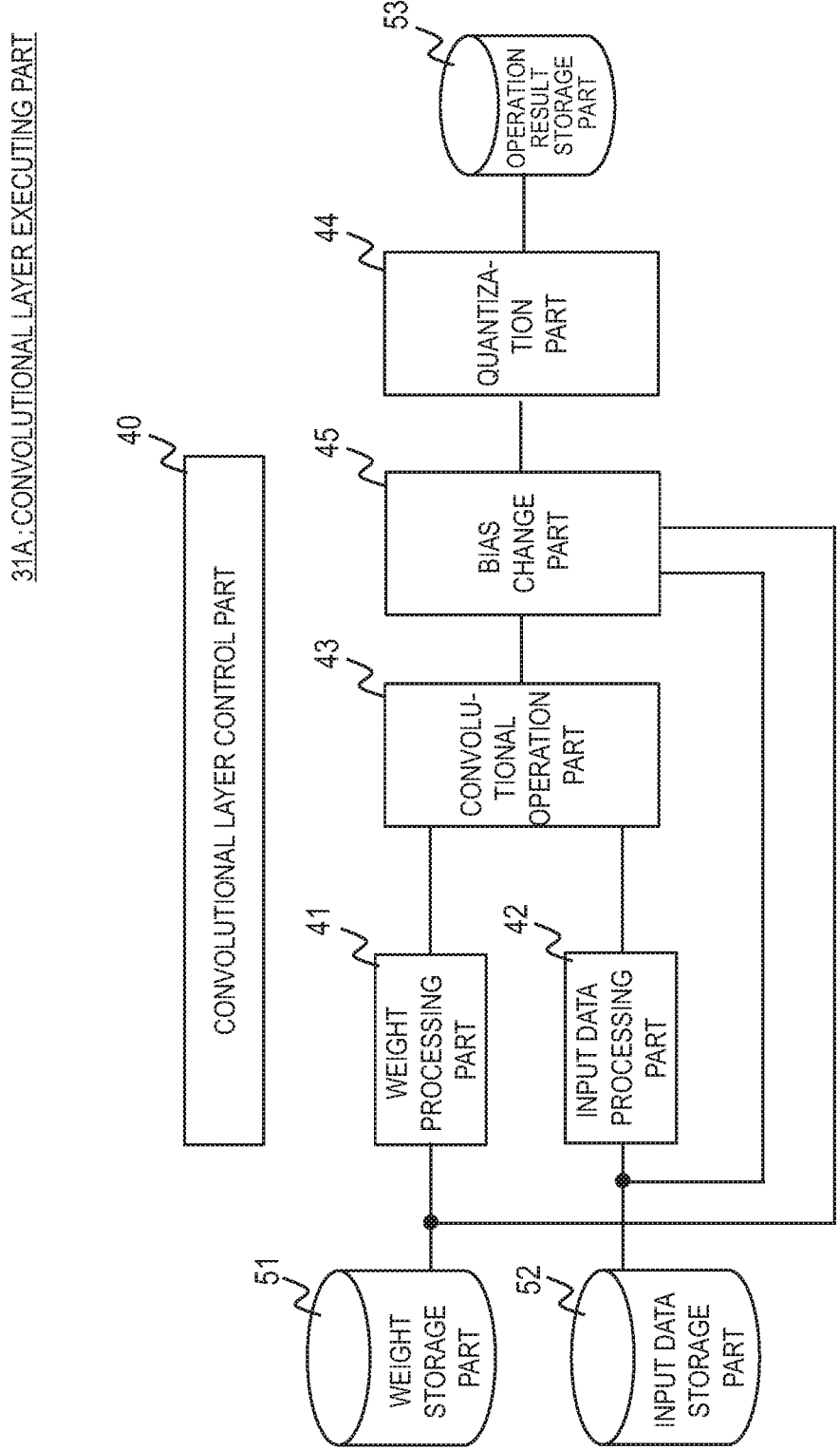
FIG. 16 illustrates a diagram showing an example of the internal configuration of the convolutional layer execution part according to a second exemplary embodiment.

FIG. 16 is a diagram showing an example of an internal configuration of the convolutional layer execution part 31a according to the second exemplary embodiment. Comparing FIG. 6 and FIG. 16, the difference between FIG. 6 and FIG. 16 resides in that a bias change part 45 is added between the convolutional operation part 43 and the quantization part 44.

The bias change part 45 is configured to obtain the weights stored in the weight storage part 51 and the input data stored in the input data storage part 52. The bias change part 45 changes the bias of the data supplied to the quantization part 44 when the result of the convolutional operation of the first layer is obtained from the convolutional operation part 43. On the other hand, when the bias change part 45 obtains the result of the convolutional operation in the second and subsequent layers, it supplies the result of the convolutional operation to the quantization part 44 without changing the initial bias.

Concretely, when the first layer convolutional operation result is obtained, the bias change part 45 calculates the above $bnew^1_k$ and adds it to the result of the convolutional operation. In more detail, the bias change part 45 calculates the average value $ave_c$ for each channel from the input data of the first layer. Thereafter, the bias change part 45 multiplies the calculated average value $ave_c$ with all elements of the weight group corresponding to each channel, and calculates the above $b'^1_k$ by adding the results of the multiplications. The bias change part 45 calculates $-b'^1_k+b^1_k$ (initial bias; predetermined fixed value), adds the calculated value to the first layer convolutional operation result as a new bias, and supplies the result to the quantization part 44. It should be noted that the operation of the bias change part 45 may be also regarded as a normalization process in which the average of the layer output values is converted to "0" and the variance is converted to "1".

As described above, in the second exemplary embodiment, the bias corresponding to the input data of the first layer is converted using the input data of the first layer and the weights corresponding to the input data of the first layer, and said converted bias is added to the result of the convolutional operation of the first layer. As a result, by subtracting the data set average value from the input data, it is possible to avoid the input data becoming negative or floating point (real number). In other words, in the second exemplary embodiment, before performing the pre-subtraction process of the input data, the convolutional operation of the first layer is performed, and then the average value of each channel is added (subtracted) along with the bias of the value concerning the pre-subtraction. The result of the convolutional operation may be a floating point (real number) by the above addition process, however the real number is rounded by logarithmic quantization by the quantization part 44 and converted into an integer. As a result, the input data in the second and subsequent layers become also integers, and the convolutional operation circuit can be shared.

[Variations]

The inferential device 10 described in the first exemplary embodiment is an example, and is not intended to limit its configuration and operation. The following is a description of various variations.

In the above exemplary embodiment, the case where the logarithmic quantization process is executed in the convolutional layer execution part 31 is explained, but the logarithmic quantization process may also be executed in the pooling layer, etc. Alternatively, the weight processing part 41 and the input data processing part 42 shown in FIG. 6 may be realized by a single module.

In the above exemplary embodiment, it is explained that the weight replication part 412 replicates the weights of the first layer; however, the convolutional operation part 43 may also eliminate (or disable) the replication process by distinguishing the "layer" in which the convolutional operation is performed. Concretely, in FIG. 7, the weight input/output part 202 may supply the required number of the same weight of the first layer successively to the multiplication/addition part 204. In the above-mentioned example, the weight input/output part 202 may supply the same weight to the multiplication/addition part 204 successively eight times.

In the above exemplary embodiment, it is explained that the input data stored in the primary input data storage part 212 and the weights stored in the primary weight storage part 211 are all supplied to the multiplication/addition part 204 regardless of the value of the input data. However, if the value of the log-quantized input data is truly "0", the multiplication result will be zero regardless of the weight value, so it is not necessary to supply the weight value corresponding to the input data "0" to the multiplication/addition part 204. Accordingly, for example, the input data input/output part 203 may detect that the value of the input data is "0" and communicate this fact to the weight input/output part 202, thereby omitting the supply of a weight value corresponding to the input data whose value is "0". In other words, when the element value of the input data is truly zero, the input data input/output part 203 and the weight input/output part 202 may cooperate and stop supplying the said data and the corresponding weight to the multiplication/addition part 204. As a result, the processing in the multiplication/addition part 204 is reduced and the convolutional operation is expected to be faster.

In the above exemplary embodiment, the case where the range in which the logarithmic quantization value by the quantization part 44 can be attained and the range in which the conversion value by the input data conversion part 402 can be attained are the same is described. Concretely, the logarithmic quantized value by the quantization part 44 and the transformed value by the input data conversion part 402 are either truly zero-indicating values or a power exponent of 0 to 7. However, the range of the logarithmic quantization value and that of the transformation value can be different. For example, the power exponent in the log-quantized value may be 0-14 and the power exponent in the transformed value may be 0-7. Even in such a case, the convolutional operation part 43 can uniformly handle the data supplied by the input data conversion part 402 with the data logarithmically quantized by the quantization part 44. In other words, if the convolutional operation part 43 can process the two data in the same way, the power exponents contained in the log-quantized value and the transformed value may take different ranges.

In the above exemplary embodiment, a configuration in which one convolutional operation part 43 executes a single convolutional operation sequentially is explained, however, a plurality of convolutional operation parts 43 may be provided to execute convolutional operations in parallel. For example, a plurality of convolutional operation parts 43 having the same configuration may be prepared, and convolutional operations may be performed independently at each convolutional operation part 43. For example, with reference to FIG. 3, one convolutional operation part 43 may perform convolutional operations with respect to the weight group 511, while another convolutional operation part 43 may perform convolutional operations with respect to the weight group 512 simultaneously (in parallel).

In the above exemplary embodiment, the case where the element value of the logarithmic quantized input data is mainly a positive value is explained, however the element value of the logarithmic quantized input data may be a negative value. That is, not only may the weights be left-shifted (the element value of the log-quantized input data is a positive value), but also may be right-shifted (the elemental value of the log-quantized input data is a negative value). For example, if the element value of the log-quantized input data is "−2", then the value in question shifts the value of the weight by two bits to the right in the multiplication with the weights.

In the above exemplary embodiment, it is presumed that the input data is an integer, but the input data may be described in floating-point terms by pre-processing of the input data and post-processing of the convolutional operation. For example, by converting a floating point to a fixed point and treating it as a pseudo-integer, the circuit of convolutional operation can be shared even if the input data is represented by a floating point.

In the second exemplary embodiment, the bias change part 45 calculates the average value $ave_c$ for each channel from the input data of the first layer. However, since the average $ave_c$ of each channel is a value that can be calculated in advance if the input data is fixed, it may be possible to calculate the average value in advance and register it in the register of the bias change part 45 in advance. In this case, the bias change part 45 calculates the above $b'^1_k$ by multiplying the pre-calculated average value $ave_c$ with all elements of the weight group corresponding to each channel, and adding the multiplication results.

In the second exemplary embodiment, an example of providing a bias change part 45 inside the convolutional layer execution part 31a has been described, but it is, of course, also possible to provide a bias change part 45 elsewhere. For example, a bias change part 45 may be provided in the convolutional operation part 43 shown in FIG. 7.

In addition, in the second exemplary embodiment, it is assumed that the $$ave_{(x-\lceil \frac{S}{2} \rceil+i),(y-\lceil \frac{R}{2} \rceil+j),c}$$

is a value that does not depend on (x, y) coordinates. Strictly speaking, however, the above assumption may not be valid because the convolution operation at the edge of the image involves padding to compensate for off-screen pixels. However, in other words, it is only in the special situation of image edges that the above assumption does not hold, and it does not have a significant impact on convolutional operations.

In the present disclosure, a method for sharing circuit(s) used for convolutional operations is described, referring to an inferential device that infers (judges) a result from input data. However, in light of exploitation of convolutional neural networks (middle layer behavior), there is no difference between the inferential device and the learning device that generates the weights. In other words, the input data to the inferential device is the data to be inferred, and the input data to the inference part of the learning device is the teacher data, but from the point of view of "inference," there is no difference between the two. In other words, the learning device can be configured by adding an error back propagation part that performs error back propagation, a weight update part that performs weight update, and the like to the inferential device 10 described above. The error back propagation part and the weight update part can be realized by a known algorithm, etc., and the explanation is omitted.

Moreover, in the plurality of flowcharts used in the above-mentioned explanation, the plurality of processes (processing) are described in order, but the order of execution of the processes executed in each embodiment is not limited to the order in which they are described. In each embodiment, the order of the illustrated processes can be changed to the extent that it does not interfere with the content, for example, by executing each process in parallel or the like.

The above exemplary embodiments can partially or entirely be described, but not limited to, as follows.

[Mode 1]
See the inferential device according to the above first aspect.

[Mode 2]
The inferential device preferably according to mode 1; wherein the input data conversion part is configured to convert the input data to the first layer while ensuring that the input data before and after the conversion is equivalent.

[Mode 3]
The inferential device preferably according to mode 2; wherein the input data conversion part is configured to extend a channel included in the input data to the first layer to a same number of subchannels as bits of elements that compose the input data to the first layer.

[Mode 4]
The inferential device preferably according to mode 3; wherein the input data conversion part is configured to: generate a sequence of data, provided that the value of each of the elements of a channel included in the input data to the first layer is expressed in binary numbers, by converting a value of a digit with value '1' to a value that indicates a position of the value '1', and by converting a value of a digit with value '0' to a value that indicates true zero, and assign each of the elements that compose the sequence of the data to each of the elements of the sub channels.

[Mode 5]
The inferential device preferably according to mode 4; wherein the input data conversion part is configured to assign each of the elements that compose the sequence of the data to a position of an element of the subchannel corresponding to the position of each of the elements of the channel included in the input data to the first layer.

[Mode 6]
The inferential device preferably according to any one of modes 1 to 5; further comprising: an input data storage part that stores the input data; and an input data acquisition part that accesses the input data storage part, acquires the input data; wherein the input data acquisition part is configured to provide the acquired input data for the input data conversion part in case where the acquired data is used for a convolutional operation of the first layer, to provide the acquired data for the convolutional operation part in case where the acquired data is used for a convolutional operation of the second layer or later.

[Mode 7]
The inferential device preferably according to any one of modes 3 to 5; further comprising: a weight duplicate part that duplicates a weight corresponding to a channel included in the input data to the first layer such that the number of weights corresponding to a channel included in the input data to the first layer becomes the same as the number of the extended subchannels.

[Mode 8]
The inferential device preferably according to mode 7; further comprising: a weight storage part that stores the weights; a weight acquisition part that accesses the weight storage part to acquire the weights; wherein the weight acquisition part is configured to: provide the acquired weights to the weight duplicate part when the acquired weights are used for a convolutional operation of the first layer, and provide the acquired weights to the convolutional operation part in case where the acquired weights are used for a convolutional operation of the second layer or later.

[Mode 9]
The inferential device preferably according to any one of modes 1 to 8; wherein the convolutional operation part is configured to realize a multiplication process in the convolutional operation by a shift operation according to the value of each of elements that compose the acquired input data.

[Mode 10]
The inferential device preferably according to mode 9; wherein the convolutional operation part is configured by including a plurality of a shift operator & adder that is arranged for each channel that composes the input data, executes the shift operation regarding the elements of the channel and weights corresponding to the elements of the channel, and adds the results of the shift operation, and an adder that adds the result of operation of the plurality of the shift operator & adder.

[Mode 11]
The inferential device preferably according to any one of modes 1 to 10; wherein the quantization part is configured to round the result of the convolutional operation to a power of two, convert a target data of quantization to an exponent whose the base is 2 or a value indicating whether or not the quantizated data is true zero.

[Mode 12]
The inferential device preferably according to any one of modes 1 to 11; further comprising: a bias change part that converts a bias corresponding to the input data to the first layer using the input data to the first layer and weights corresponding to the input data to the first layer, and adds the converted bias to the result of the convolutional operation of the first layer.

[Mode 13]
See the inferential method according to the above second aspect.

[Mode 14]
See the program according to the above third aspect.

Modes 13 and 14 can be expanded in the same way as mode 1 is expanded to modes 2 to 12.

Each disclosure of the above PTL, etc. is incorporated herein by reference thereto. Variations and adjustments of the exemplary embodiments and examples are possible within the ambit of the disclosure (including the claims) of the present invention and based on the basic technical concept of the present invention. Various combinations and selections of various disclosed elements (including the elements in the claims, exemplary embodiment, examples, drawings, etc.) are possible within the ambit of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been concretely disclosed.

REFERENCE SIGNS LIST 10, 100 inferential device
11 input layer executing part
12 middle layer executing part
13 output layer executing part
31,31a convolutional layer executing part
32 activation function executing part
33 pooling layer executing part
40 convolutional layer control part
41 weight processing part
42 input data processing part
43 convolutional operation part
44 quantization part
45 bias change part
51 weight storage part
52 input data storage part
53 operation result storage part
91 CPU (Central Processing Unit)
92 memory
93 input/output interface
94 NIC (Network Interface Card)
103,402 input data conversion part
201 convolutional operation control part
202 weight input/output part
203 input data input/output part
204 multiplication/addition part
211 primary weight storage part
212 primary input data storage part
213 primary operation result memory part
301,301-1 to 301-N shift operation and adder
302,312 adder
311 shift operator
313 register
401 input data acquisition part
411 weight acquisition part
412 weight replication part
501,502 weights
511,512 weight group
601,611 input data

The invention claimed is:

1. An inferential device, comprising:
a quantization part that quantizes a result of a convolutional operation in a first layer of a convolutional neural network using input data and weights to obtain input data for the convolutional operation in a next layer;
a convolutional operation part that includes a plurality of a shift operator and adder that is arranged for each channel that composes the input data, executes a shift operation regarding elements of the channel and weights corresponding to the elements of the channel, and adds a result of the shift operation, and an adder that adds the results of operation of the plurality of the shift operator and adder, and executes a multiplication process in the convolutional operation by the shift operation according to the value of each of elements that compose the acquired input data; and an input data conversion part that extends a channel included in the input data to the first layer to a same number of subchannels as a number of bits of elements that compose the input data to the first layer, generates a sequence of data, provided that the value of each of the elements of a channel included in the input data to the first layer is expressed in binary numbers, by converting a value in a digit with value '1' to a value that indicates a position of the value '1', and by converting a value in a digit with value '0' to a value that indicates a true zero, and assign each of the elements that compose the sequence of the data to each of the elements of the subchannels to enable the convolutional operation part to process both the input data to the first layer and the input data that is quantized by the quantization part in a same way.

2. The inferential device according to claim 1; wherein the input data conversion part is configured to assign each of the elements that compose the sequence of the data to a position of an element of the subchannel corresponding to the position of each of the elements of the channel included in the input data to the first layer.

3. The inferential device according to claim 1; further comprising:
an input data storage part that stores the input data; and
an input data acquisition part that accesses the input data storage part, acquires the input data; wherein
the input data acquisition part is configured to provide the acquired input data for the input data conversion part in case where the acquired data is used for a convolutional operation of the first layer, and provide the acquired data for the convolutional operation part in case where the acquired data is used for a convolutional operation of the second layer or later.

4. The inferential device according to claim 1; further comprising:
a weight duplicate part that duplicates a weight corresponding to a channel included in the input data to the first layer such that the number of weights corresponding to a channel included in the input data to the first layer becomes the same as the number of the extended subchannels.

5. The inferential device according to claim 4; further comprising:
a weight storage part that stores the weights;
a weight acquisition part that accesses the weight storage part to acquire the weights; wherein
the weight acquisition part is configured to:
provide the acquired weights to the weight duplicate part when the acquired weights are used for a convolutional operation of the first layer, and
provide the acquired weights to the convolutional operation part in case where the acquired weights are used for a convolutional operation of the second layer or later.

6. The inferential device according to claim 1; wherein the quantization part is configured to round the result of the convolutional operation to a power of two, and convert a target data of quantization to an exponent whose the base is 2 or a value indicating whether or not the quantizated data is true zero.

7. The inferential device according to claim 1; further comprising:
a bias change part that converts a bias corresponding to the input data to the first layer using the input data to the first layer and weights corresponding to the input data to the first layer, and adds the converted bias to the result of the convolutional operation of the first layer.

8. A method of performing a convolutional operation performed in an inferential device, comprising:
a quantization part that quantizes a result of a convolutional operation in a convolutional neural network using an input data and weights; and
a convolutional operation part that includes a plurality of a shift operator and adder that is arranged for each channel that composes the input data, executes a shift operation regarding elements of the channel and weights corresponding to the elements of the channel, and adds a result of the shift operation, and an adder that adds the results of operation of the plurality of the shift operator and adder, and executes a multiplication process in the convolutional operation by the shift operation according to a value of each of elements that compose the acquired input data, the method comprising:
acquiring the input data;
extending a channel included in the input data to a first layer to a same number of subchannels as a number of bits of elements that compose the input data to the first layer;
generating a sequence of data, provided that the value of each of the elements of a channel included in the input data to the first layer is expressed in binary numbers, by converting a value in a digit with value '1' to a value that indicates a position of the value '1', and by converting a value in a digit with value '0' to a value that indicates a true zero; and
assigning each of the elements that compose the sequence of the data to each of the elements of the subchannels to enable to process both the input data to the first layer and the input data that is quantized by the quantization part in a same way in case where the acquired data is used for a convolutional operation of the first layer.

9. A non-transient computer readable medium storing a program, executed by a computer that performs a convolutional operation, installed in an inferential device comprising:
a quantization part that quantizes a result of a convolutional operation in a convolutional neural network using input data and weights; and
a convolutional operation part that includes a plurality of a shift operator and adder that is arranged for each channel that composes the input data, executes a shift operation regarding elements of the channel and weights corresponding to the elements of the channel, and adds a result of the shift operation, and an adder that adds the results of operation of the plurality of the shift operator and adder, and executes a multiplication process in the convolutional operation by the shift operation according to a value of each of elements that compose the acquired input data, wherein the program causes the computer to perform processings of:
acquiring input data;
extending a channel included in the input data to the first layer to a same number of subchannels as a number of bits of elements that compose the input data to the first layer;
generating a sequence of data, provided that the value of each of the elements of a channel included in the input data to the first layer is expressed in binary numbers, by converting a value in a digit with value '1' to a value that indicates a position of the value '1', and by converting a value in a digit with value '0' to a value that indicates a true zero; and assigning each of the elements that compose the sequence of the data to each of the elements of the subchannels to enable to process both the input data to the first layer and the input data that is quantized by the quantization part in a same way in case where the acquired data is used for a convolutional operation of the first layer.

\* \* \* \* \*